US012773629B2

(12) United States Patent
Cui et al.

(10) Patent No.: US 12,773,629 B2
(45) Date of Patent: Oct. 27, 2026

(54) OBJECT CONTROL METHOD AND APPARATUS FOR VIRTUAL SCENE, ELECTRONIC DEVICE, COMPUTER PROGRAM PRODUCT, AND COMPUTER-READABLE STORAGE MEDIUM

(71) Applicant: Tencent Technology (Shenzhen) Company Limited, Shenzhen (CN)

(72) Inventors: Weijian Cui, Shenzhen (CN); Boyi Liu, Shenzhen (CN); Meng Qiu, Shenzhen (CN); Cong Tian, Shenzhen (CN); Jingjing He, Shenzhen (CN); Dancheng Zou, Shenzhen (CN); Yu Deng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 471 days.

(21) Appl. No.: 18/214,903

(22) Filed: Jun. 27, 2023

(65) Prior Publication Data

US 2023/0330536 A1 Oct. 19, 2023

Related U.S. Application Data

(63) Continuation of application No. PCT/CN2022/120775, filed on Sep. 23, 2022.

(30) Foreign Application Priority Data

Oct. 21, 2021 (CN) ......................... 202111227167.8
Dec. 31, 2021 (CN) ......................... 202111672352.8

(51) Int. Cl.
*A63F 13/52* (2014.01)
*A63F 13/22* (2014.01)
(Continued)

(52) U.S. Cl.
CPC ............ *A63F 13/533* (2014.09); *A63F 13/22* (2014.09); *A63F 13/52* (2014.09); *A63F 13/55* (2014.09);
(Continued)

(58) Field of Classification Search
None
See application file for complete search history.

(56) References Cited

U.S. PATENT DOCUMENTS

2012/0242590 A1* 9/2012 Baccichet ............... A63F 13/42 345/173
2013/0084980 A1* 4/2013 Hammontree ...... A63F 13/2145 463/36
(Continued)

FOREIGN PATENT DOCUMENTS

CN 102436308 A * 5/2012
CN 105597310 A * 5/2016 ............. A63F 13/52
(Continued)

OTHER PUBLICATIONS

Jokesta, I found a new 3 finger claw hud for Call of Duty Mobile! Super easy for beginners in cod mobile!, Aug. 8, 2021, https://www.youtube.com/watch?v=0595c1nM_sQ , p. 1 (Year: 2021).*
(Continued)

*Primary Examiner* — Tramar Harper
(74) *Attorney, Agent, or Firm* — Morgan, Lewis & Bockius LLP

(57) ABSTRACT

This application provides a method for controlling a virtual object in a virtual scene performed by an electronic device. The method includes: displaying a virtual scene, the virtual scene comprising a virtual object; displaying a first action button and a second action button, and displaying a connection button; and in response to a trigger operation for the connection button, controlling the virtual object to execute
(Continued)

a first action associated with the first action button and a section action associated with the second action button.

18 Claims, 18 Drawing Sheets

(51) Int. Cl.
*A63F 13/533* (2014.01)
*A63F 13/55* (2014.01)
*G06T 11/00* (2006.01)
*A63F 13/837* (2014.01)

(52) U.S. Cl.
CPC ............. *G06T 11/00* (2013.01); *A63F 13/837* (2014.09); *G06T 2200/24* (2013.01)

(56) References Cited

U.S. PATENT DOCUMENTS

| | | | | |
|---|---|---|---|---|
| 2013/0113724 | A1* | 5/2013 | Chung | G06F 3/04886 345/173 |
| 2015/0182856 | A1* | 7/2015 | Mays, III | G06F 3/0488 463/31 |
| 2015/0258430 | A1* | 9/2015 | Alexeev | G06F 3/04883 463/36 |
| 2018/0311582 | A1* | 11/2018 | Gerhard | A63F 13/426 |
| 2019/0030431 | A1* | 1/2019 | Zhang | A63F 13/2145 |
| 2019/0091561 | A1* | 3/2019 | Li | G06F 3/04842 |
| 2020/0282308 | A1* | 9/2020 | Guo | A63F 13/537 |
| 2020/0353355 | A1 | 11/2020 | Wang | |

FOREIGN PATENT DOCUMENTS

| | | | | | |
|---|---|---|---|---|---|
| CN | 107835148 | A | | 3/2018 | |
| CN | 109568949 | A | | 4/2019 | |
| CN | 109568962 | A | * | 4/2019 | A63F 13/92 |
| CN | 112190932 | A | * | 1/2021 | A63F 13/837 |
| CN | 113926181 | A | | 1/2022 | |
| CN | 114210047 | A | | 3/2022 | |
| CN | 115167719 | A | * | 10/2022 | G06F 3/0488 |
| JP | 2005204756 | A | | 8/2005 | |
| JP | 2014236907 | A | | 12/2014 | |
| JP | 2018068827 | A | | 5/2018 | |
| KR | 101051068 | B1 | * | 7/2011 | A63F 13/2145 |
| KR | 20160072757 | A | * | 6/2016 | G06F 3/048 |
| WO | WO-2019205839 | A1 | * | 10/2019 | A63F 13/822 |
| WO | WO-2019223448 | A1 | * | 11/2019 | A63F 13/56 |
| WO | WO-2021017784 | A1 | * | 2/2021 | G06F 3/04883 |

OTHER PUBLICATIONS

Controllerzz, PS Rapid Fire, Oct. 1, 2010, https://web.archive.org/web/20201001082754/https://customcontrollerzz.com/ps4-rapid-fire/, pgs. 1-4 (Year:2010).*

Tencent Technology, Japanese Office Action, JP Patent Application No. 2023-571193, Nov. 12, 2024, 4 pgs.

Rzx, "King of Glory Right-Click Mobile Attack Simulator Android Version . . . ", Feb. 21, 2020, 3 pgs., Retrieved from the Internet: https://www.soyohui.com/game/79265/.

Tencent Technology, ISR, PCT/CN2022/120775, Dec. 16, 2022, 3 pgs.

Mo Jin Game Says, "Reloaded: How to Merge the Attack Buttons? Free Your Fingers and Start Full Weapon Attack with One Key", Feb. 3, 2020, 5 pgs., Retrieved from the Internet: https://baijiahao.baidu.com/s?id=1657519241708584141&wfr=spider&for=pc.

Tencent Technology, WO, PCT/CN2022/120775, Dec. 16, 2022, 5 pgs.

Tencent Technology, IPRP, PCT/CN2022/120775, Apr. 23, 2024, 6 pgs.

* cited by examiner

OBJECT CONTROL METHOD AND APPARATUS FOR VIRTUAL SCENE, ELECTRONIC DEVICE, COMPUTER PROGRAM PRODUCT, AND COMPUTER-READABLE STORAGE MEDIUM

CROSS-REFERENCE TO RELATED APPLICATIONS

This application is a continuation application of PCT Patent Application No. PCT/CN2022/120775, entitled "OBJECT CONTROL METHOD AND APPARATUS FOR VIRTUAL SCENE, ELECTRONIC DEVICE, COMPUTER PROGRAM PRODUCT, AND COMPUTER-READABLE STORAGE MEDIUM" filed on Sep. 23, 2022, which is based on and claims priority to Chinese Patent Application No. 202111227167.8 with an application date of Oct. 21, 2021, and Chinese Patent Application No. 202111672352.8 with an application date of Dec. 31, 2021, all of which are incorporated by reference herein in the entirety.

FIELD OF THE TECHNOLOGY

This application relates to the technical field of human-computer interaction, and in particular to, an object control method and apparatus for a virtual scene, an electronic device, a computer program product, and a computer-readable storage medium.

BACKGROUND OF THE DISCLOSURE

The display technology based on graphic processing hardware extends the perception environment and the access to information, especially the multimedia technology of a virtual scene. With the help of the technology of the human-computer interaction engine, the diversified interaction between virtual objects controlled by users or artificial intelligence can be realized according to the actual application requirements. With various typical application scenes, for example, in virtual scenes such as games, the battle process between virtual objects can be simulated.

The human-computer interaction between the virtual scene and the user is realized through a human-computer interaction interface, and a plurality of buttons are displayed in the human-computer interaction interface. After each button is triggered, the virtual object can be controlled to execute a corresponding operation. For example, after a jumping button is triggered, the virtual object can be controlled to jump in the virtual scene, and sometimes the virtual object needs to simultaneously complete shooting and other actions in the battle scene. For example, the virtual object shoots while lying down, thus allowing both ambush and attacking an enemy. However, in the related technology, the user needs to use multiple fingers to frequently click for operations if it is desired to simultaneously complete shooting and other actions, which has high operation difficulty and precision requirements, resulting in low human-computer interaction efficiency.

SUMMARY

The embodiments of this application provide an object control method and apparatus for a virtual scene, an electronic device, a computer program product, and a computer-readable storage medium, which can improve the control efficiency of the virtual scene.

The technical solutions of the embodiments of this application are implemented as follows:

The embodiments of this application provide a method for controlling a virtual object in a virtual scene executed by an electronic device, including:

displaying a virtual scene, the virtual scene including a virtual object;

displaying a first action button and a second action button, and displaying a connection button; and in response to a trigger operation for the connection button, controlling the virtual object to execute a first action associated with the first action button and a section action associated with the second action button.

The embodiments of this application provide an electronic device, including:

a memory, configured to store computer-executable instructions; and a processor, configured to implement, in executing the computer-executable instructions stored in the memory, the object control method for a virtual scene provided by the embodiments of this application.

The embodiments of this application provide a non-transitory computer-readable storage medium storing computer-executable instructions for implementing the object control method for a virtual scene provided by the embodiments of this application during being executed by a processor.

The embodiments of this application have the following beneficial effects:

An attack button and an action button are displayed, and a connection button configured to connect the attack button and the action button is displayed; the virtual object is controlled to execute an action associated with a target action button and synchronously perform an attack operation using the attack prop in response to a trigger operation for a target connection button; and an action operation and an attack operation can be executed simultaneously by arranging the connection button, which is equivalent to using a single button to realize multiple functions simultaneously, saving operation time, and thus improving the control efficiency in the virtual scene.

DESCRIPTION OF EMBODIMENTS

Figure 1:
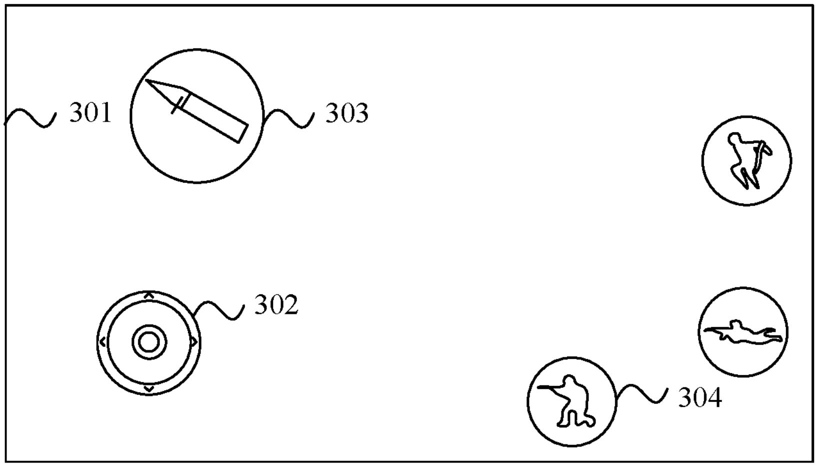
FIG. 1 is a diagram of a display interface of an object control method for a virtual scene provided by the related technology.

In order to make the objects, technical solutions, and advantages of this application clearer, embodiments of this application will be further described in detail below with reference to the drawings. The described embodiments are not to be considered as a limitation to this application. All other embodiments, obtained by the ordinarily skilled in the art without creative efforts, shall fall within the protection scope of this application.

In the following description, the term "some embodiments" describes subsets of all possible embodiments, but it may be understood that "some embodiments" may be the same subset or different subsets of all the possible embodiments, and can be combined with each other without conflict.

In the following description, the terms "first, second, and third" are merely intended to distinguish similar objects and do not represent a particular ordering of the objects. It may be understood that the terms "first, second, and third" may be interchanged either in a particular order or in a sequential order, as permitted, to enable the embodiments of this application described herein to be implemented other than that illustrated or described herein.

Unless otherwise defined, meanings of all technical and scientific terms used in this specification are the same as those usually understood by a person skilled in the art to which this application belongs. The terms used herein are for the purpose of describing the embodiments of this application only and are not intended to limit this application.

Before the embodiments of this application are further described in detail, a description is made on terms in the embodiments of this application. The terms in the embodiments of this application are applicable to the following explanations.

(1) A virtual scene is a scene, output by a device, differentiating from a real world. A visual perception of the virtual scene can be formed through the naked eye or the assistance of the device, for example, a two-dimensional image output by a display screen, and a three-dimensional image output by stereoscopic display technologies such as stereoscopic projection, virtual reality, and augmented reality technologies. In addition, a variety of simulated real-world perceptions, such as auditory perception, tactile perception, olfactory perception, and motion perception, may alternatively be formed by various possible hardware.

(2) In response to is used for representing a condition or state upon which the performed operation depends. The performed operation or operations may be in real-time or may have a set delay in response to meeting the dependent condition or state. Without being specifically stated, there is no limitation in the order of execution of the performed operations.

(3) A client is an application program running in a terminal for providing various services, such as a game client.

(4) A virtual object is an object that interacts in a virtual scene, and an object, controlled by a user or a robot program (for example, an artificial intelligence-based robot program), can stand still, move and perform various behaviors in a virtual scene, such as various characters in a game.

(5) A button is a control for human-computer interaction in a human-computer interaction interface of a virtual scene. The button, with pattern identification, is bound to a specific processing logic. When a user triggers the button, a corresponding processing logic will be executed.

Referring to FIG. 1, FIG. 1 is a diagram of a display interface of an object control method for a virtual scene provided by the related technology. In the virtual scene, a virtual object needs to simultaneously complete shooting and actions. For example, the virtual object shoots while lying down, thus allowing both ambush and attacking an enemy. However, in the related technology, the user needs to use multiple fingers to frequently click for operations if it is desired to simultaneously complete shooting and the actions (the actions include left and right probe, squatting, and lying down), which has high operation difficulty and precision requirements. A direction button 302, an attack button 303, and an action button 304 are displayed in a human-computer interaction interface 301 in FIG. 1. The direction button 302 is usually controlled by a left thumb, the attack button 303 or the action button 304 is controlled by a right thumb. With regard to a virtual scene of a mobile phone end, the human-computer interaction interface is usually controlled by the left and right thumbs, namely, the default operation mode is a two-finger operation mode, one thumb controlling the direction, the other thumb controlling the virtual exclusive execution of specific operations. Therefore, it is difficult for the user to simultaneously perform shooting and action operations through the default two-finger key position operation. The user can simultaneously perform shooting and action operations only through the multi-finger operation (at least 3 fingers) by adjusting the button layout. Even so, the multi-finger operation requires high learning cost and proficiency, increasing the button area percentage of the screen, interfering with the user's field of view with a high probability, and making the operation experience of most users more difficult.

The embodiments of this application provide an object control method and apparatus for a virtual scene, an electronic device, a non-transitory computer-readable storage medium, and a computer program product. By arranging a connection button, actions, and attack operations after triggering the connection button can be executed simultaneously, which is equivalent to using a single button to realize multiple functions simultaneously, thus improving the operation efficiency of the user. An exemplary application of the electronic device provided by the embodiments of this application is described below. The electronic device provided by the embodiments of this application can be implemented as various types of user terminals such as a laptop, a tablet, a desktop computer, a set-top box, and a mobile device (for example, a mobile phone, a portable music player, a personal digital assistant, a dedicated messaging device, and a portable gaming device).

In order to facilitate an easier understanding of the object control method for a virtual scene provided by the embodiments of this application, first, an exemplary implementation scenario of the object control method for a virtual scene provided by the embodiments of this application will be described. The virtual scene may be output entirely based on the terminal or based on the cooperation of the terminal and the server.

In some embodiments, the virtual scene may be an environment for a game character to interact with, for example, for a game character to perform a rival battle in the virtual scene; and two-sided interaction may be performed in the virtual scene by controlling the action of the virtual object, thereby enabling a user to relax the stress of life during the game.

Figure 2A:
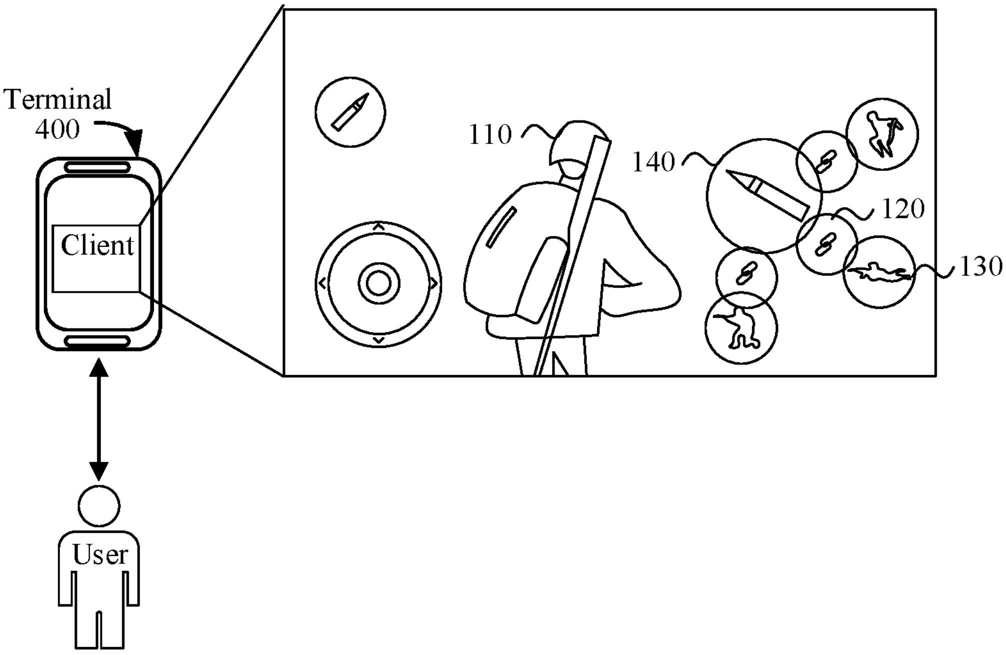
FIG. 2A is a diagram of an application mode of an object control method for a virtual scene provided by an embodiment of this application.

In one implementation scenario, referring to FIG. 2A, FIG. 2A is a diagram of an application mode of an object control method for a virtual scene provided by an embodiment of this application. The method is applicable to some application modes which can complete the calculation of relevant data of the virtual scene completely relying on the computing capability of a terminal 400, for example, a game in a stand-alone/off-line mode, where the output of the virtual scene is completed by a terminal 400 such as a smartphone, a tablet, and a virtual reality/augmented reality device.

When forming the visual perception of the virtual scene, the terminal 400 calculates data required for display via the graphic computing hardware, and completes the loading, parsing, and rendering of the display data, and outputs a video frame capable of forming the visual perception of the virtual scene on the graphic output hardware, for example, a video frame for presenting two-dimension on a display screen of a smartphone, or a video frame for realizing a three-dimensional display effect by projecting on a lens of augmented reality/virtual reality glasses. Furthermore, in order to enrich the perception effect, the device may alternatively form one or more of auditory perception, tactile perception, motion perception, and taste perception through different hardware.

As an example, during the terminal 400 running a client (for example, a stand-alone version of a game application), the terminal 400 outputs a virtual scene including role-playing during the running process of the client, where the virtual scene is an environment for a game character to interact with, for example, may be a plain, a street, a valley, and the like for the game character to fight. The virtual scene includes a virtual object 110, a connection button 120, an action button 130, and an attack button 140. The virtual object 110 may be a game character controlled by a user (or called a user), namely, the virtual object 110 is controlled by a real user, and will move in the virtual scene in response to the operation of the real user for a controller (including a touch screen, a sound control switch, a keyboard, a mouse, a rocker, and the like). For example, when the real user moves the rocker to the left, the virtual object will move to the left part in the virtual scene; the virtual object is controlled to execute an action in the virtual scene in response to a trigger operation for the action button 130; the virtual object is controlled to perform an attack operation in the virtual scene in response to a trigger operation for the attack button 140; and the virtual object is controlled to execute an action and synchronously perform an attack operation in response to a trigger operation for the connection button 120.

Figure 2B:
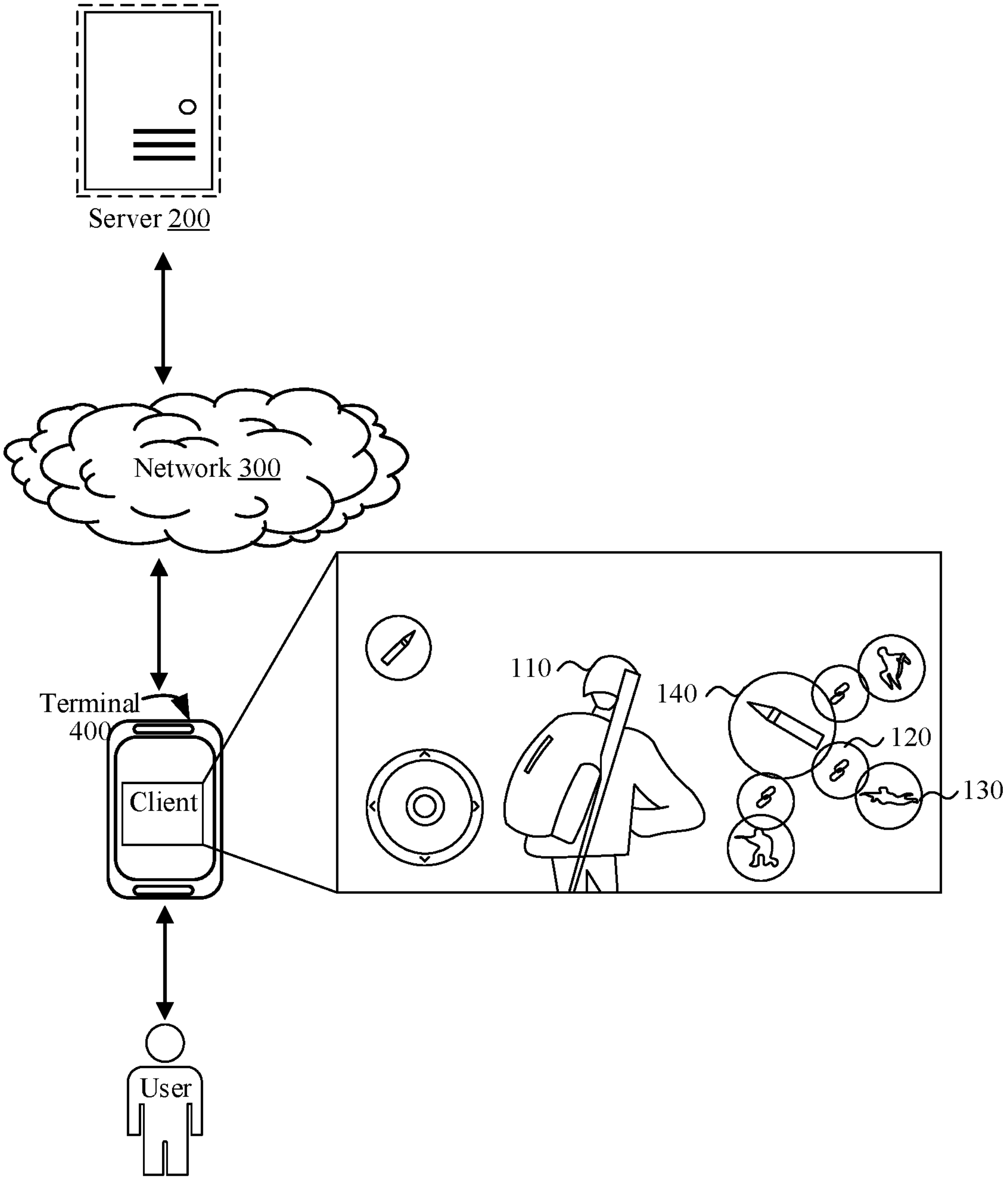
FIG. 2B is a diagram of an application mode of an object control method for a virtual scene provided by an embodiment of this application.

In another implementation scenario, referring to FIG. 2B, FIG. 2B is a diagram of an application mode of an object control method for a virtual scene provided by an embodiment of this application, which is applied to a terminal 400 and a server 200. The method is generally applicable to an application mode that completes the calculation of a virtual scene relying on the computing capability of the server 200, and outputs the virtual scene at the terminal 400.

Taking the visual perception of forming a virtual scene as an example, the server 200 calculates display data related to the virtual scene and sends same to the terminal 400; the terminal 400 completes the loading, parsing, and rendering of the calculated display data relying on graphic calculation hardware, and outputs the virtual scene relying on graphic output hardware to form the visual perception, for example, a video frame for presenting two-dimension on a display screen of a smartphone, or a video frame for realizing a three-dimensional display effect by projecting on a lens of augmented reality/virtual reality glasses. With regard to the perception in the form of a virtual scene, it will be appreciated that it is possible to form an auditory perception through corresponding hardware outputs of the terminal, for example using a microphone output, and form a tactile perception using a vibrator output, and the like.

As an example, a terminal 400 runs a client (for example, a network version of a game application). A virtual scene includes a virtual object 110, a connection button 120, an action button 130, and an attack button 140. Game interaction is performed with other users via a connection game server (namely, a server 200). In response to a trigger operation for the connection button 120, the client sends action configuration information about an action executed by the virtual object 110 and operation configuration information about an attack operation performed synchronously using an attack prop to the server 200 via a network 300; the server 200 calculates display data of the operation configuration information and the action configuration information based on the above information, and sends the above display data to the client; and the client completes the loading, parsing, and rendering of the calculated display data relying on the graphics calculation hardware, and outputs a virtual scene relying on the graphics output hardware to form a visual perception, that is, displaying an image of the virtual object 110 executing an action associated with a target action button and synchronously performing an attack operation using an attack prop.

In some embodiments, the terminal 400 may implement the object control method for a virtual scene provided by the embodiments of this application by running a computer program, for example, the computer program may be a native program or a software module in an operating system. It can be a local application (APP), namely, a program that needs to be installed in the operating system to run, such as a game APP (namely, the above client). It can be an applet, namely, a program that only needs to be downloaded to the browser environment to run. It can also be a game applet that can be embedded in any APP. In general, the above computer programs may be any form of APP, module, or plug-in.

The embodiments of this application may be implemented through cloud technology, which refers to a hosting technology for unifying a series of resources, such as hardware, software, and a network, in a wide area network or a local area network to realize the calculation, storage, processing, and sharing of data.

Cloud technology is a general term for network technology, information technology, integration technology, management platform technology, and application technology based on cloud computing business model application, which can form a resource pool and be used on demand with flexibility and convenience. Cloud computing technology will become an important support. Background services of technical network systems require a large amount of computing and storage resources.

As an example, a server 200 may be an independent physical server, and may alternatively be a server cluster or distributed system composed of a plurality of physical servers, and may further be a cloud server providing basic cloud computing services such as cloud services, cloud databases, cloud computing, cloud functions, cloud storage, network services, cloud communication, middleware services, domain name services, security services, content delivery network (CDN), as well as big data and artificial intelligence platforms. The terminal 400 may be but is not limited to, a smartphone, a tablet, a laptop, a desktop computer, a smart speaker, a smartwatch, and the like. The terminal 400 and the server 200 may be directly or indirectly connected through wired or wireless communication, which are not limited in the embodiments of this application.

Figure 3:
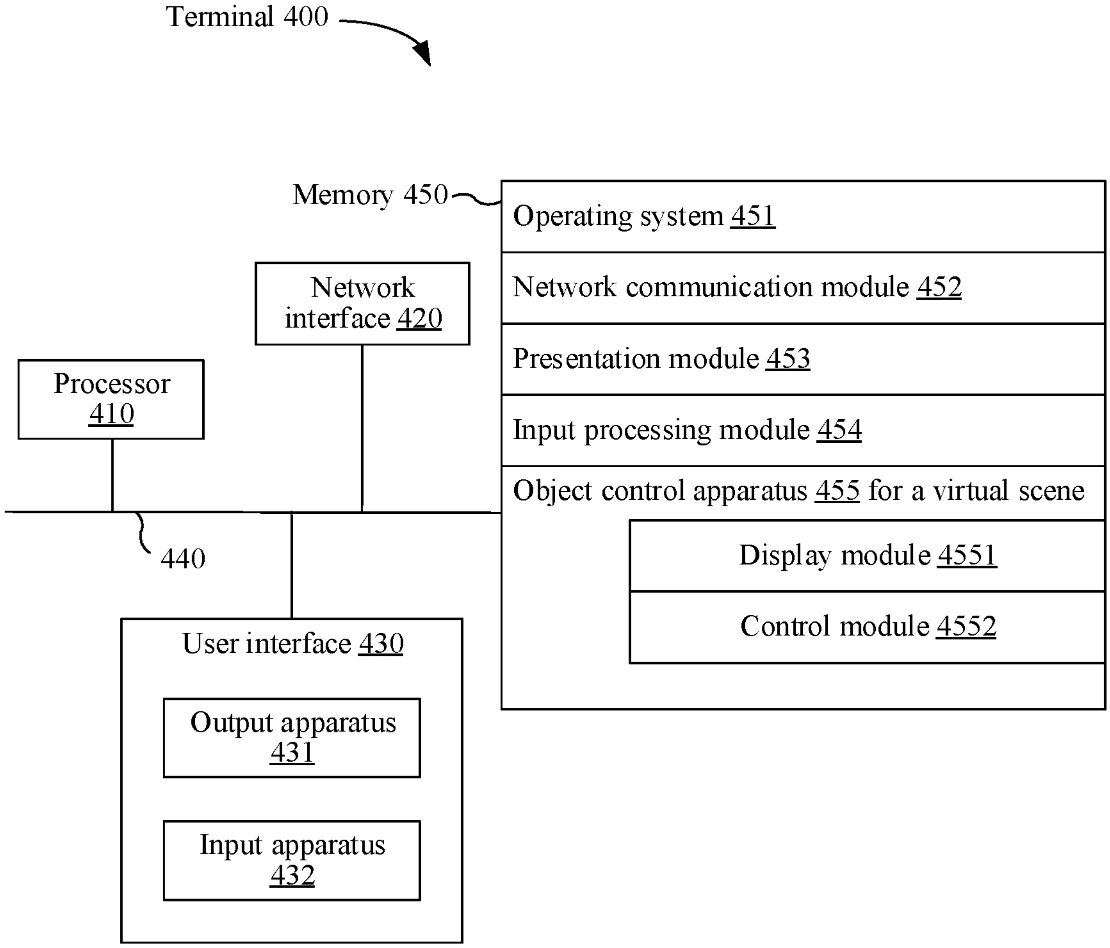
FIG. 3 is a structural diagram of an electronic device applying an object control method for a virtual scene provided by an embodiment of this application.

Referring to FIG. 3, FIG. 3 is a structural diagram of an electronic device provided by an embodiment of this application. The terminal 400 shown in FIG. 3 includes at least one processor 410, a memory 450, at least one network interface 420, and a user interface 430. The various assemblies in the terminal 400 are coupled together by a bus system 440. It may be understood that the bus system 440 is configured to enable connection communication between the assemblies. The bus system 440 includes a power bus, a control bus, and a status signal bus in addition to a data bus. However, for the sake of clarity, the various buses are labeled as the bus system 440 in FIG. 3.

The processor 410 may be an integrated circuit chip with signal processing capabilities, such as a general-purpose processor, a digital signal processor (DSP), or other programmable logic devices, discrete gate or transistor logic devices, discrete hardware assemblies, and the like, where the general-purpose processor may be a microprocessor or any conventional processor, and the like.

The user interface 430 includes one or more output apparatuses 431 that enable the presentation of media content, including one or more speakers and/or one or more visual display screens. The user interface 430 further includes one or more input apparatuses 432, including user interface components that facilitate user input, such as a keyboard, mouse, microphone, touch-screen display, camera, other input buttons, and buttons.

The memory 450 may be removable, non-removable, or a combination thereof. Exemplary hardware devices include solid state memories, hard disk drives, optical disk drives, and the like. The memory 450 may include one or more storage devices physically located remotely from the processor 410.

The memory 450 includes a volatile memory or a non-volatile memory and may include both volatile and non-volatile memories. The non-volatile memory may be a read-only memory (ROM), and the volatile memory may be a random-access memory (RAM). The memory 450 described in the embodiments of this application is intended to include any suitable type of memory.

In some embodiments, the memory 450 is capable of storing data to support various operations, and the examples of the data include programs, modules, and data structures, or subsets or supersets thereof, as exemplified below.

An operating system 451 is used for implementing various basic services and processing hardware-based tasks, including system programs for processing various basic system services and executing hardware-related tasks, such as a framework layer, a core library layer, and a driver layer.

A network communication module 452 is used for reaching other electronic devices via one or more (wired or wireless) network interfaces 420, an exemplary network interface 420 including Bluetooth, WiFi, a universal serial bus (USB), and the like.

A presentation module 453 is used for enabling the presentation of information (for example, a user interface for operating peripheral devices and displaying content and information) via one or more output apparatuses 431 (for example, a display screen and a speaker) associated with the user interface 430.

An input processing module 454 is used for detecting one or more user inputs or interactions from one of the one or more input apparatuses 432 and interpreting the detected inputs or interactions.

In some embodiments, an object control apparatus for a virtual scene provided by the embodiments of this application may be implemented in a software manner. FIG. 3 shows an object control apparatus 455 for a virtual scene stored in a memory 450, which can be software in the form of a program, a plug-in, and the like, including the following software modules: a display module 4551 and a control module 4552, which are logical and therefore can be arbitrarily combined or further split depending on the function implemented. The functions of the various modules will be described below.

In some embodiments, a terminal or a server may implement the object control method for a virtual scene provided by the embodiments of this application by running a computer program. For example, the computer program may be a native program or a software module in an operating system. It can be a local application (APP), namely, a program that needs to be installed in the operating system to run, such as a game APP or an instant messaging APP. It can be an applet, namely, a program that only needs to be downloaded to the browser environment to run. It can also be an applet that can be embedded in any APP. In general, the above computer programs may be any form of APP, module, or plug-in.

The object control method for a virtual scene provided by the embodiments of this application may be executed by the terminal 400 in FIG. 2A alone, or may be executed by the terminal 400 and the server 200 in FIG. 2B in cooperation. For example, in step 103, in response to a trigger operation for a target connection button, controlling the virtual object to execute an action associated with a target action button and controlling the virtual object to synchronously perform an attack operation using an attack prop can be executed by the terminal 400 and the server 200 in cooperation. The server 200 determines that the virtual object executes the action associated with the target action button, and uses the attack prop to synchronize the execution result of the attack operation, and returns the execution result to the terminal 400 for display.

Figure 4A:
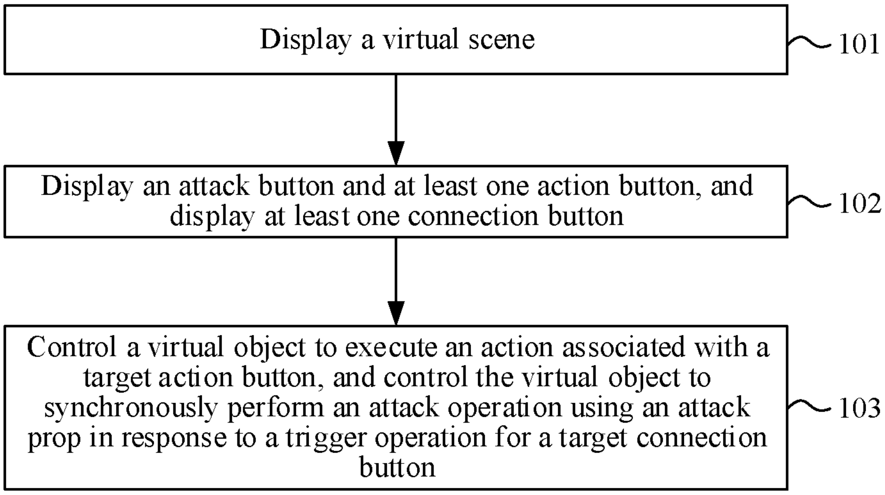
FIG. 4A to FIG. 4C are schematic flowcharts of an object control method for a virtual scene provided by an embodiment of this application.

Illustrated in the following is that an object control method for a virtual scene provided by this embodiment of this application is separately executed by the terminal 400 in FIG. 2A. Referring to FIG. 4A, FIG. 4A is a schematic flowchart of an object control method for a virtual scene provided by an embodiment of this application, which will be illustrated in combination with the steps shown in FIG. 4A.

The method shown in FIG. 4A may be executed by various forms of computer programs run by the terminal 400 and is not limited to the above client, such as the operating system 451, software modules, and scripts described above. Therefore, the client is not to be considered a limitation on the embodiments of this application. In the following examples, the use of a virtual scene for a game is taken as an example, but is not to be considered as a limitation on the virtual scene.

Step 101: Display a virtual scene.

As an example, during the terminal running a client, the terminal outputs a virtual scene including role-playing during the running process of the client, where the virtual scene is an environment for a game character to interact with, for example, may be a plain, a street, a valley, and the like for the game character to fight. The virtual scene includes a virtual object holding an attack prop, where the virtual object can be a game character controlled by a user (or called a player), that is, the virtual object is controlled by a real user, and will move in the virtual scene in response to the operation of the real user for a controller (including a touch screen, a sound control switch, a keyboard, a mouse, a rocker, and the like). For example, when the real user moves the rocker to the left, a first virtual object will move to the left in the virtual scene, and can also remain stationary in place, jump, and use various functions (such as skills and props). An attack prop is a virtual prop that can be used and held by a virtual object and has an attack function. The attack prop includes at least one of the following: a shooting prop, a throwing prop, and a fighting prop.

Step 102: Display an attack button and at least one action button, and display at least one connection button.

As an example, each connection button is used to connect one attack button and one action button, for example, displaying an attack button A, an action button B1, an action button C1, and an action button D1, where a connection button B2 is displayed between the action button B1 and the attack button A; a connection button C2 is displayed between the action button C1 and the attack button A; and a connection button D2 is displayed between the action button D1 and the attack button A. The number of connection buttons is the same as the number of action buttons, and each action button corresponds to one connection button.

Step 103: Control the virtual object to execute an action associated with the target action button, and control the virtual object to synchronously perform an attack operation using the attack prop in response to a trigger operation for a target connection button.

As an example, a target action button is an action button connected to a target connection button in at least one action button, and the target connection button is any connection button selected in at least one connection button. For example, an attack button A, an action button B1, an action button C1, and an action button D1 are displayed in a human-computer interaction interface, where a connection button B2 is displayed between the action button B1 and the attack button A; a connection button C2 is displayed between the action button C1 and the attack button A; and a connection button D2 is displayed between the action button D1 and the attack button A. Taking a target connection button as a connection button B2 as an example, in response to a trigger operation for the connection button B2, an action button B1 connected to the connection button B2 is identified as a target action button, so as to control the virtual object to execute an action associated with the action button B1, and to control the virtual object to synchronously perform an attack operation using an attack prop.

Figure 9A:
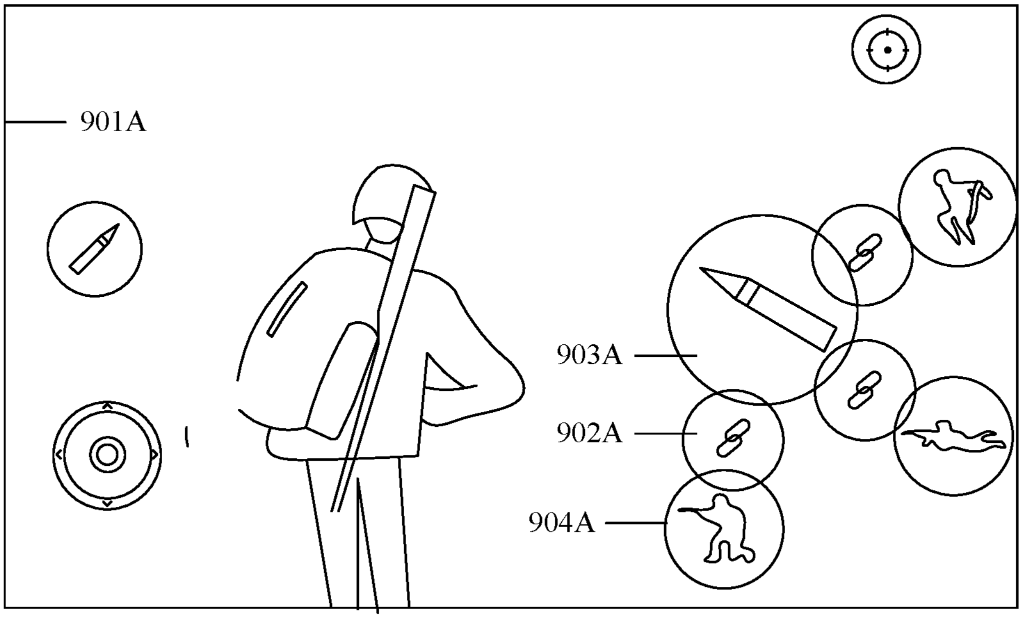
FIG. 9A to FIG. 9E are diagrams of display interfaces of an object control method for a virtual scene provided by an embodiment of this application.
Figure 9B:
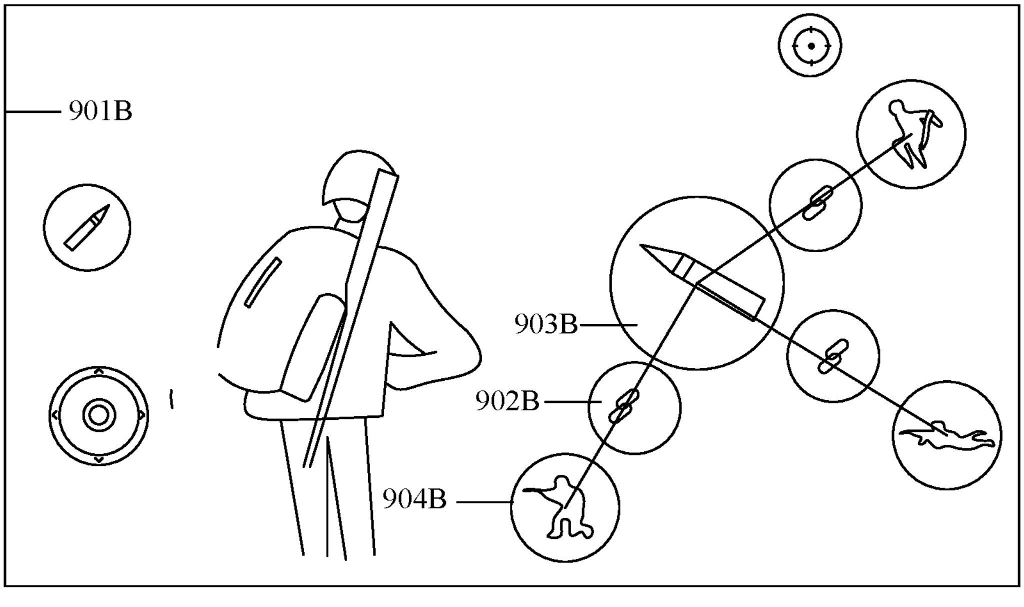
Figure 9C:
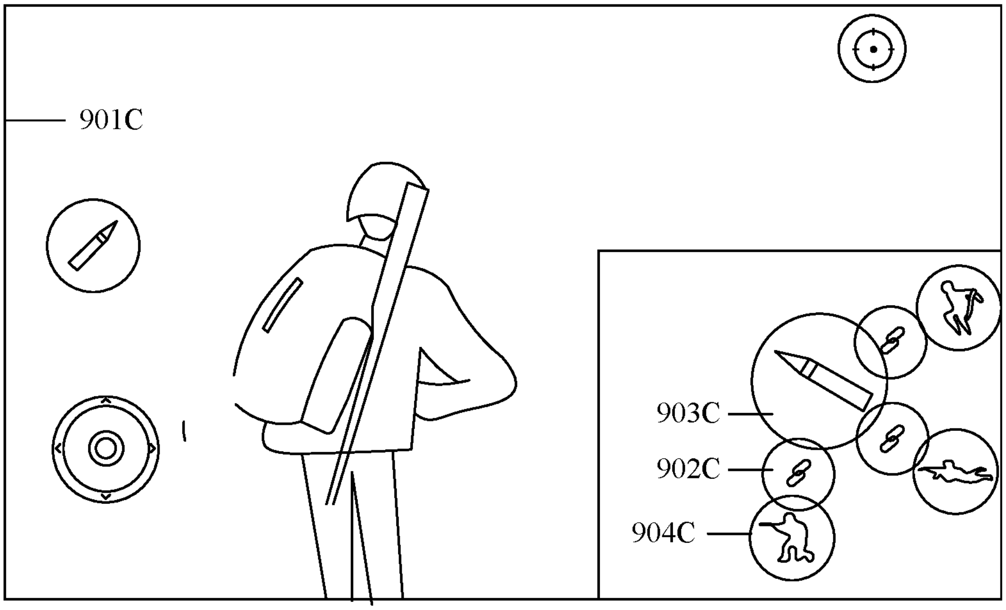

As an example, referring to FIG. 9A, FIG. 9A is a diagram of a display interface of an object control method for a virtual scene provided by an embodiment of this application. A connection button 902A is displayed in a human-computer interaction interface 901A; the connection button 902A is used for connecting an attack button 903A and an action button 904A; the connection button 902A is arranged between the attack button 903A and the action button 904A; the region where the connection button 902A, the attack button 903A, and the action button 904A are located all falls within an operation region; and the connection button 902A, the attack button 903A, and the action button 904A are all embedded in the operation region. As shown in FIG. 9A, the buttons can be displayed in the operation region embedded in the virtual scene. Referring to FIG. 9C, FIG. 9C is a diagram of a display interface of an object control method for a virtual scene provided by an embodiment of this application. A connection button 902C is displayed in a human-computer interaction interface 901C; the connection button 902C is used for connecting an attack button 903C and an action button 904C; the connection button 902C is arranged between the attack button 903C and the action button 904C; the region where the connection button 902C, the attack button 903C, and the action button 904C are located all falls within an operation region, the operation region being independent of the virtual scene. As shown in FIG. 9C, the buttons can be displayed in the operation region independent of the virtual scene.

Figure 4B:
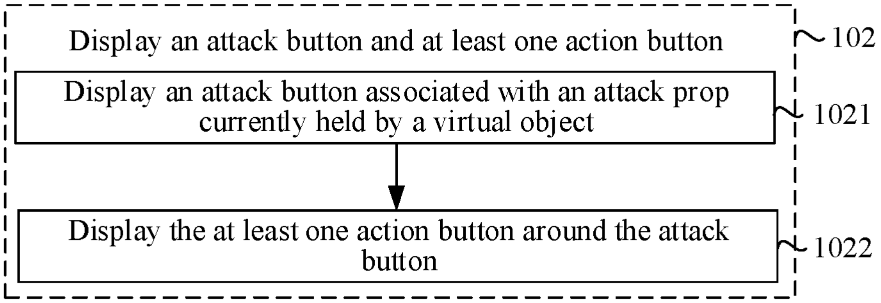

In some embodiments, referring to FIG. 4B, FIG. 4B is a schematic flowchart of an object control method for a virtual scene provided by an embodiment of this application. An attack button and at least one action button are displayed in step 102, which can be implemented by steps 1021 to 1022 in FIG. 4B.

Step 1021: Display an attack button associated with the attack prop currently held by the virtual object.

As an example, during the attack button being triggered, the virtual object performs an attack operation using an attack prop, where when the attack prop currently held by the virtual object is a pistol, the attack button of the pistol is displayed; when the attack prop currently held by the virtual object is a crossbow, the attack button of the crossbow is displayed; and when the attack prop currently held by the virtual object is a mine, the attack button of the mine is displayed.

Step 1022: Display the at least one action button around the attack button.

Figure 5A:
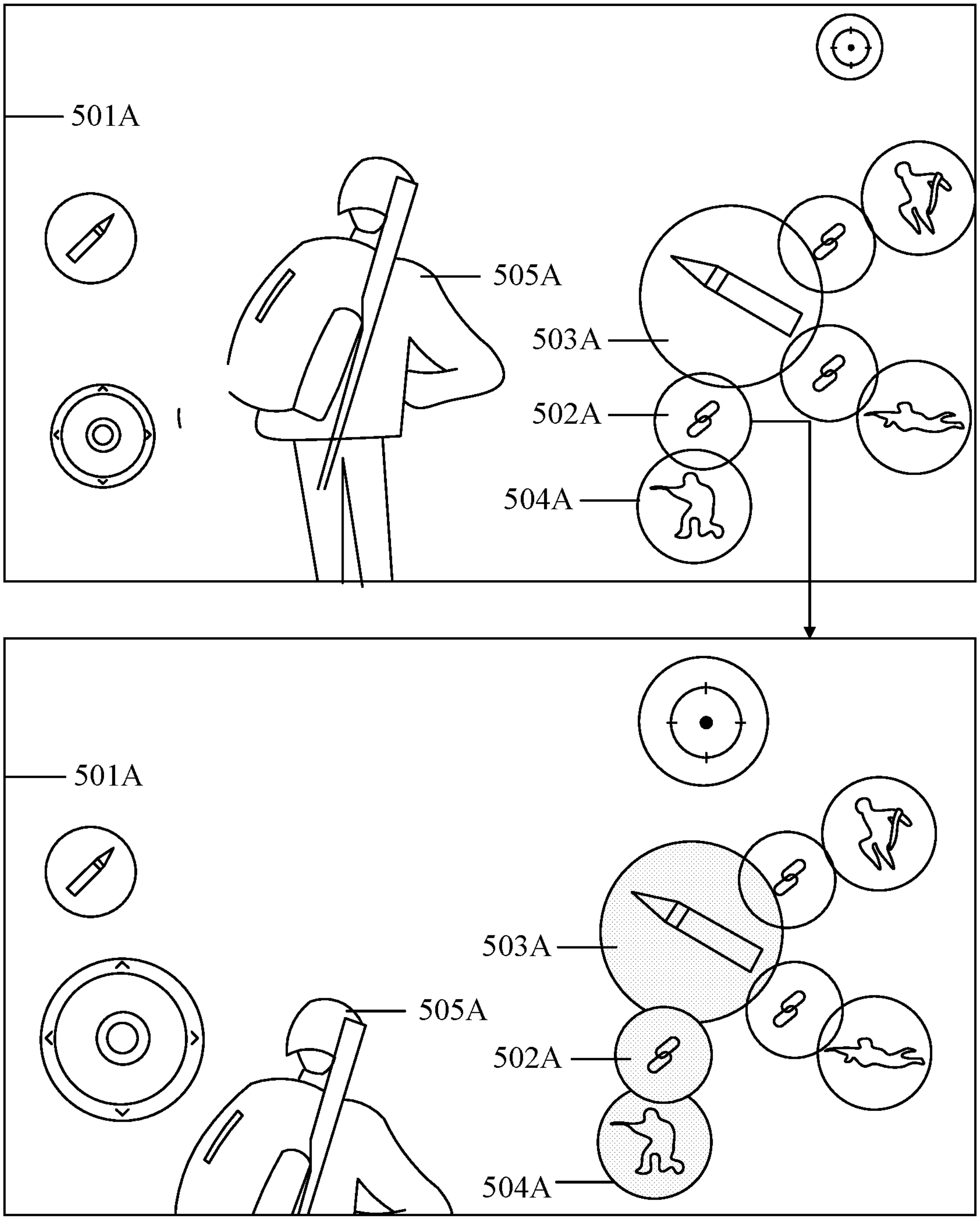
FIG. 5A to FIG. 5E are diagrams of display interfaces of an object control method for a virtual scene provided by an embodiment of this application.

As an example, referring to FIG. 5A, FIG. 5A is a diagram of a display interface of an object control method for a virtual scene provided by an embodiment of this application. A connection button 502A is displayed in a human-computer interaction interface 501A, and three connection buttons 502A are displayed between an attack button 503A and three action buttons 504A. In FIG. 5A, the three connection buttons 502A are displayed around the attack button 503A, and the three action buttons 504A are displayed around the attack button 503A. Each action button is associated with one action, for example, the action button 504A is associated with a squatting action, and the other two action buttons are associated with a lying down action and a jumping action. The ease of an operation can be improved by a layout that displays at least one action button around the attack button.

In some embodiments, types of the at least one action button include at least one of the following: an action button associated with a high-frequency action, the high-frequency action being a candidate action with an operation frequency higher than an operation frequency threshold among a plurality of candidate actions; and an action button associated with a target action, the target action being adapted to a state of the virtual object in the virtual scene, which characterizes that the target action is suitable for the virtual object to be executed in the current virtual scene; for example, the action suitable for being executed in the current virtual scene is a jumping action in response to the state of the virtual object in the virtual scene being an attacked state, the jumping action being a target action adapted to the state of the virtual object in the virtual scene; each state of the virtual object in the virtual scene is configured with at least one adapted target action; by personalizing the action associated with the action button, the user's operational efficiency can be improved so that the user can more conveniently trigger the execution of the user's desired action in performing a human-computer interaction operation.

As an example, an operation frequency threshold is obtained based on past data statistics. For example, the server may count the actual operation frequency of each candidate action in the interaction data of the last week, and then perform averaging processing on the actual operation frequencies of a plurality of candidate actions, and the result of averaging processing is taken as the operation frequency threshold, where the interaction data here may be all the interaction data in the last week.

As an example, when the action button is triggered, the action executed by a virtual object can be a default setting action. Referring to FIG. 5E, FIG. 5E is a diagram of a display interface of an object control method for a virtual scene provided by an embodiment of this application. A squatting action button 504-1E, a lying down action button 504-2E, and a jumping action button 504-3E are displayed in a human-computer interaction interface 501E. The virtual object is controlled to execute a squatting action alone in response to a trigger operation of a user for the squatting action button 504-1E. The virtual object is controlled to execute a lying down action alone in response to a trigger operation of the user for the lying down action button 504-2E. The virtual object is controlled to execute a jumping action alone in response to a trigger operation of the user for the jumping action button 504-3E.

As an example, the squatting action button 504-1E, the lying down action button 504-2E, and the jumping action button 504-3E in FIG. 5E may be default settings.

As an example, the action button may alternatively be personalized. For example, the action button is an action button associated with a high-frequency action, where the high-frequency action is a candidate action with an operation frequency higher than an operation frequency threshold of a virtual object A among a plurality of candidate actions, or the high-frequency action is a candidate action with an operation frequency higher than an operation frequency threshold of a virtual object B of the same camp among a plurality of candidate actions. For example, based on the operation data of the virtual object A itself, it is determined that the number of times the virtual object A performs a jumping action is higher than the operation frequency threshold of the virtual object A. The operation frequency threshold of the virtual object A is an average value of the number of times the virtual object A performs each action, then the jumping action is a high-frequency action among a plurality of candidate actions. Based on the operation data of the virtual object B of the same camp, it is determined that the number of times the virtual object B of the same camp performs the jumping action is higher than the operation frequency threshold of the virtual object B. The operation frequency threshold of the virtual object B is an average value of the number of times of the virtual object B performing each action, then the jumping action is a high-frequency action among a plurality of candidate actions. An action button may also be associated with a target action. The target action is adapted to the state of the virtual object in the virtual scene, for example, if there are a large number of enemies in the virtual scene, the virtual object A needs to hide itself. Therefore, the action adapted to the state of the virtual object A in the virtual scene is a lying down action, and the lying down action is the target action.

In some embodiments, at least one connection button is displayed in step 102, which may be implemented by the following technical solutions: displaying, for each action button in the at least one action button, the connection button configured to connect the action button and the attack button, the connection button having at least one of the following display properties: the connection button including a disabled icon in response to in a disabled state, and the connection button including an available icon in response to in an available state. Displaying a connection button in different states via different display attributes, so as to effectively prompt a user that the connection button can be triggered or cannot be triggered, improving the operation efficiency of the user and avoiding outputting an invalid operation.

As an example, a disabled icon is displayed on the upper layer of the layer where the connection button is located when the connection button is set to off, and an available icon is displayed on the upper layer of the layer where the connection button is located when the connection button is set to on, for example, the available icon may be an icon of the connection button itself. Referring to FIG. 5D, FIG. 5D is a diagram of a display interface of an object control method for a virtual scene provided by an embodiment of this application. A disabled icon 505D is displayed on the connection button 503D when the connection button is set to off; and the disabled icon 505D is hidden on the connection button 503D when the connection button is set to on, displaying only the icon of the connection button 503D itself, and in displaying the disabled icon, it may be directly superimposed on the icon of the connection button 503D itself for display.

In some embodiments, at least one connection button is displayed in step 102, which may be implemented by the following technical solutions: recognizing an action adapted to the state of the virtual object in the virtual scene, regarding a button associated with the corresponding action as a target action button, and only displaying a connection button configured to connect the target action button and the attack button. Since only the target connection button associated with the target action button is displayed, the proportion of the view occupied by simultaneously displaying a plurality of connection buttons can be saved, providing a larger display region for the virtual scene. The displayed connection button is exactly the connection button required by the user, improving the efficiency of the user in finding a suitable connection button and improving the intelligent degree of human-computer interaction.

Figure 9D:
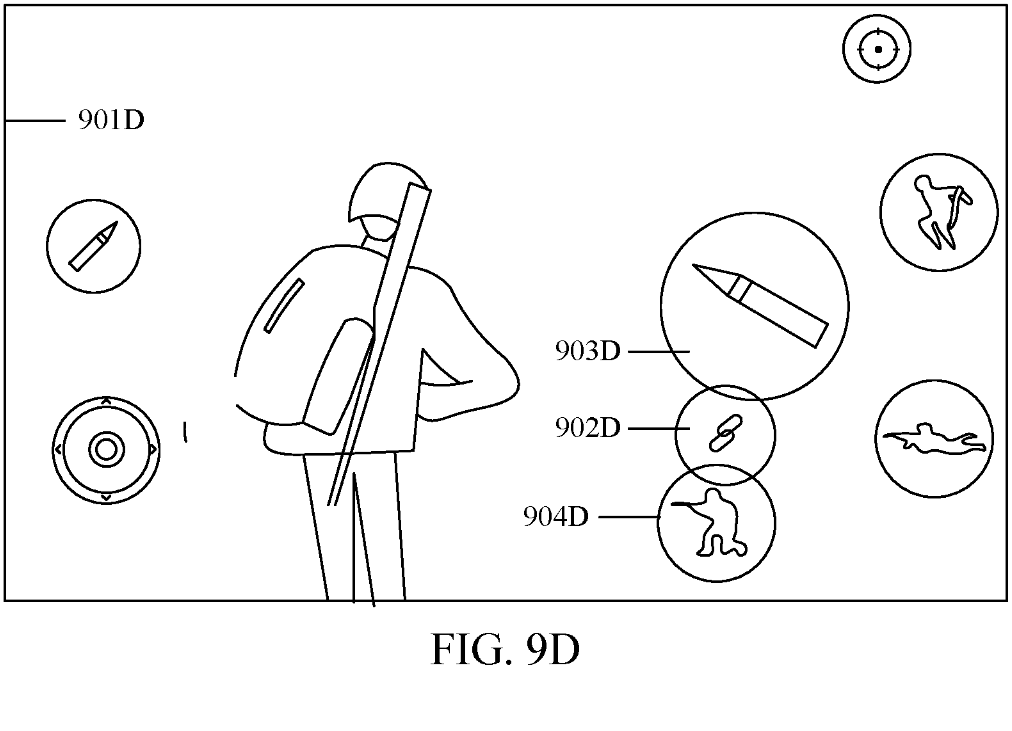

As an example, reference is made to FIG. 9D in a case where only a connection button configured to connect a target action button and an attack button is displayed, and no connection buttons between other action buttons and the attack button are displayed. FIG. 9D is a diagram of a display interface of an object control method for a virtual scene provided by an embodiment of this application. A connection button 902D is displayed in a human-computer interaction interface 901D; the connection button 902D is used for connecting an attack button 903D and an action button 904D; and the connection button 902D is arranged between the attack button 903D and the action button 904D. FIG. 9D only shows an action button 904D corresponding to a squatting action, an attack button 903D, and a connection button 902D corresponding to the squatting action, the action button 904D corresponding to the squatting action being a target action button. The squatting action is an action associated with the target action button, and the squatting action is adapted to the state of the virtual object in the virtual scene. For example, if there are more enemies in the virtual scene, the user needs to attack the enemies and also needs to be concealed appropriately, and therefore the action adapted to the state of the virtual object in the virtual scene is the squatting action.

In some embodiments, at least one connection button is displayed in step 102, which may be implemented by the following technical solutions: displaying, for the target action button in the at least one action button, the connection button configured to connect the target action button and the attack button based on a first display mode, and displaying, for other action buttons except the target action button in the at least one action button, a connection button configured to connect the other action buttons and the attack button based on a second display mode, so as to significantly prompt the user to trigger the connection button associated with the target action button, thereby improving the operation efficiency of the user.

Figure 9E:
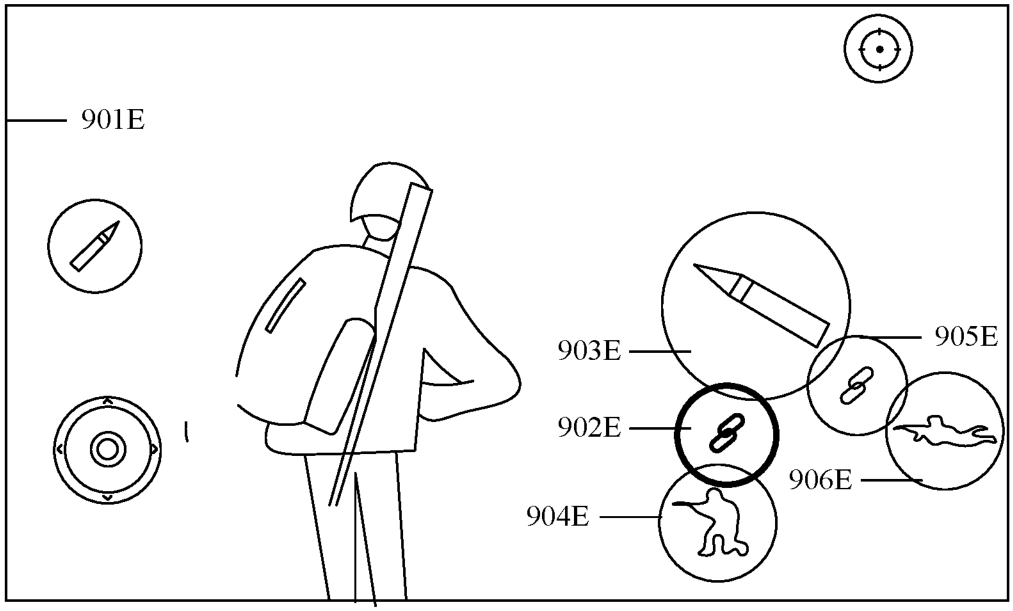

As an example, referring to FIG. 9E, FIG. 9E is a diagram of a display interface of an object control method for a virtual scene provided by an embodiment of this application. A connection button 902E is displayed in a human-computer interaction interface 901E, where the connection button 902E is used for connecting an attack button 903E and a squatting action button 904E. A connection button 905E is displayed in the human-computer interaction interface 901E, where the connection button 905E is used for connecting the attack button 903E and a lying down action button 906E. If the squatting action button is a target action button, the connection button 902E for connecting the attack button 903E and the squatting action button 904E is displayed based on a first display mode, and the connection button 905E for connecting the attack button 903E and the lying down action button 906E is displayed based on a second display mode, the first display mode being more significant than the second display mode. For example, the brightness of the first display mode is higher than the brightness of the second display mode; for example, the color contrast of the first display mode is higher than the color contrast of the second display mode.

As an example, the connection button may be displayed at all times, for example, the connection button may be displayed on demand, that is, the connection button switches from a non-display state to a display state. Being displayed on demand refers to highlighting in meeting a condition of the being displayed on demand, the condition of the being displayed on demand including at least one of the following: The group to which the virtual object belongs interacts with other groups, for example, the group to which the virtual object belongs engages with the other groups. The group to which the virtual object belongs refers to a combat team to which the virtual object belongs. At least one virtual object in a virtual scene can form a combat team to perform an activity in the virtual scene. The distance between a virtual object and other virtual objects of other groups is less than a distance threshold, for example, a connection button can be highlighted on demand, namely, being highlighted in the case of always displaying. For example, a dynamic effect of the connection button is displayed, and being highlighted on demand refers to highlighting in meeting a condition for highlighting. The condition for highlighting includes at least one of the following: the group to which the virtual object belongs interacting with other groups; and a distance between the virtual object and other virtual objects of other groups being less than the distance threshold.

In some embodiments, interaction data of a virtual object and scene data of a virtual scene are acquired, where the scene data includes at least one of the environment data of the virtual scene, weather data of the virtual scene, and battle condition data of the virtual scene; the interaction data of the virtual object includes at least one of a position of the virtual object in the virtual scene A, a life value of the virtual object, equipment data of the virtual object, and comparison data of two parties to a battle. Based on the interaction data and the scene data, a neural network model is invoked to predict a compound action, the compound action including an attack operation and a target action. The action button associated with the target action is taken as a target action button. The target action can be determined more accurately through neural network prediction, and then the associated target action button can be further determined, so that the adaptation degree of the compound action to the current virtual scene is higher, thereby improving the user's operation efficiency.

As an example, sample interaction data between various sample virtual objects in each sample virtual scene is collected in a sample virtual scene pair, and sample scene data of each sample virtual scene is collected in the sample virtual scene pair; a training sample is constructed according to the collected sample interaction data and sample scene data; the neural network model is trained with the training sample as an input of a to-be-trained neural network model and with a sample compound action adapted to the sample virtual scene as annotation data, thereby invoking the neural network model to predict the compound action based on the interaction data and the scene data.

In some embodiments, a similar historical virtual scene is determined for a virtual scene, where a similarity between the similar historical virtual scene and the virtual scene is greater than a similarity threshold. A highest-frequency action in a similar historical virtual scene is determined, where the highest-frequency action is a candidate action with the highest operation frequency among a plurality of candidate actions. The action button associated with the highest-frequency action is taken as the target action button. The scene similarity can be determined more accurately through a scene neural network model to improve the determination accuracy of the similar historical virtual scene, so that the highest-frequency action obtained based on the similar historical virtual scene can be most suitable to be applied to the current virtual scene. Therefore, the subsequent users can accurately and efficiently control the virtual object to implement the corresponding action in the virtual scene, thereby effectively improving the user's operation efficiency.

As an example, a similar historical virtual scene B is determined for a virtual scene A, the similarity between the virtual scene A and the similar historical virtual scene B being greater than a similarity threshold; interaction data of the virtual scene A and interaction data of the historical virtual scene are collected; a scene neural network model is invoked to perform scene similarity prediction processing based on the interaction data, to obtain a scene similarity between the virtual scene A and the historical virtual scene. The interaction data includes at least one of the following: a position of the virtual object in the virtual scene A, a life value of the virtual object, equipment data of the virtual object, and comparison data of two parties to a battle.

In some embodiments, the manner in which each connection button is used for connecting an attack button and an action button includes: The connection button partially overlaps with one attack button and one action button. A display region of a connection button is connected to an attack button and an action button via a connection identifier, and the connection button is associated with the attack button and the action button on the display in an overlapping manner. Therefore, a connection relationship between a plurality of buttons laid out in a human-computer interaction interface can be prompted to a user without affecting the visual field, thereby avoiding the false triggering of the connection button. For example, the user wants to control a virtual object to simultaneously perform shooting and jumping; however, the user triggers the connection button of the squatting action button and the shooting button because the connection relationship characterized by the button layout is unclear, causing the virtual object to simultaneously performing squatting and shooting.

As an example, referring to FIG. 9A, FIG. 9A is a diagram of a display interface of an object control method for a virtual scene provided by an embodiment of this application. A connection button 902A is displayed in a human-computer interaction interface 901A; the connection button 902A is used for connecting an attack button 903A and an action button 904A; and the connection button 902A is arranged between the attack button 903A and the action button 904A and partially overlaps with a display region of the attack button 903A and the action button 904A. Referring to FIG. 9B, FIG. 9B is a diagram of a display interface of an object control method for a virtual scene provided by an embodiment of this application. The connection identifier includes at least one of the following: an arrow, a curve, and a line segment. A connection button 902B is displayed in a human-computer interaction interface 901B; the connection button 902B is used for connecting an attack button 903B and an action button 904B; the connection button 902B is arranged between the attack button 903B and the action button 904B and has no overlap with a display region of the attack button 903B and the action button 904B; and the connection button 902B is connected to the attack button 903B and the action button 904B via a line (such as an arrow, a curve, and a line segment).

Figure 4C:
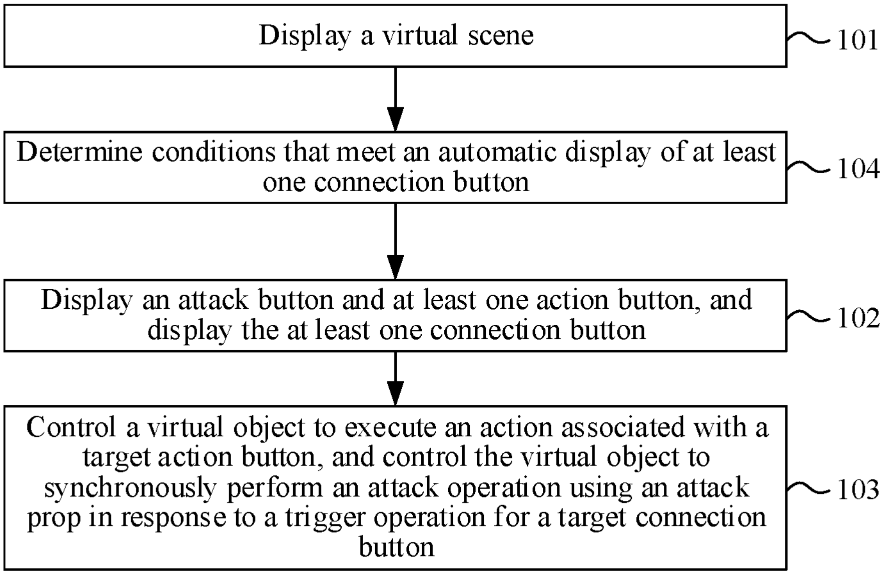

In some embodiments, referring to FIG. 4C, FIG. 4C is a schematic flowchart of an object control method for a virtual scene provided by an embodiment of this application. Step 104 is performed before at least one connection button is displayed in step 102.

Step 104: Determine conditions that meet an automatic display of the at least one connection button.

As an example, the conditions include at least one of the following: a group of the virtual object interacting with other groups of other virtual objects, for example, the group of the virtual object fighting with the other groups of the other virtual objects; and a distance between the virtual object and the other virtual objects of the other groups being less than a distance threshold.

As an example, the connection button may be displayed according to the conditions; only the attack button and the action button may be displayed when the conditions are not met; and the connection button may be displayed after the conditions are met so that a battle view of the user can be guaranteed. At least one connection button is automatically displayed when an interaction occurs between the group of the virtual object and the other groups of the other virtual objects, for example, a battle occurs; and at least one connection button is automatically displayed when a distance between the virtual object and the other virtual objects of the other groups is less than the distance threshold.

As an example, the connection button may be kept in a display state; and the at least one connection button is always synchronously displayed when the attack button and the at least one action button are displayed. Therefore, the connection button can be kept displayed even if no interaction occurs between the group of the virtual object and the other groups of the other virtual objects, or the distance between the virtual object and the other virtual objects of the other groups is not less than the distance threshold, that is, in any case, causing that the user can trigger the connection button at any time, and improving the flexibility of user operation.

In some embodiments, after displaying the attack button and the at least one action button and displaying the at least one connection button, a plurality of candidate actions are displayed in response to a replacement operation for any action button, the plurality of candidate actions being different from actions associated with the at least one action button. Actions associated with any action button is replaced with candidate actions selected in response to a selection operation for the plurality of candidate actions.

As an example, an object control method for a virtual scene provided by an embodiment of this application provides an adjustment function of the action button; a replacement function of the action button is provided in the process of fighting against a virtual scene; an action associated with the action button is replaced with other actions so as to flexibly switch various actions. A connection button is displayed in a human-computer interaction interface; the connection button is used for connecting an attack button and the action button; the attack button is associated with a virtual prop currently held by the virtual object by default; and in response to a replacement operation for the action button, a plurality of candidate key position contents to be replaced are displayed, namely, a plurality of candidate actions are displayed. For example, when the key position content of the action button is a squatting action, the selected candidate key position content is updated to the action button to replace the squatting action in response to a selection operation for a plurality of candidate actions to be replaced, namely, supporting replacing the key position content of the action button being a squatting action with a lying down action, and may also be replaced with a probe. A combined attack mode of a shooting operation and a probe operation can be realized, so that a plurality of action combinations can be realized without occupying an excessive display region, thereby realizing a plurality of combined attack modes.

As an example, an object control method for a virtual scene provided by the embodiments of this application provides an adjustment function of an action button which can also be automatically replaced according to a user's operation habit. In the process of fighting against a virtual scene, a replacement function of the action button is provided, and an action associated with the action button is replaced with other actions so as to flexibly switch various actions. A connection button is displayed in a human-computer interaction interface; the connection button is used for connecting an attack button and the action button; the attack button is associated with a virtual prop currently held by a virtual object by default. In response to a user's replacement operation or in response to a change in the virtual scene, the key position content obtained by automatic matching is updated to the action button to replace the squatting action, that is, supporting replacing the key position content of the action button being a squatting action with the key position content obtained by automatic matching, for example, replacing same with the squatting. The process of automatic matching is obtained according to virtual scene matching, that is, obtaining an action adapted to the virtual scene as the key position content, so that various action combinations can be intelligently realized without occupying too many display regions, thereby realizing various combined attack modes.

In some embodiments, the attack prop is in a single attack mode. Controlling the virtual object to execute an action associated with the target action button, and controlling the virtual object to synchronously perform an attack operation using the attack prop in step 103 can be implemented by the following technical solutions: controlling the virtual object to execute an action associated with the target action button once, and restoring a posture of the virtual object before executing the action in response to a posture after executing the action being different from the posture before executing the action; and controlling the virtual object to perform an attack operation once using the attack prop starting from controlling the virtual object to execute the action associated with the target action button; and controlling the virtual object to execute a momentary action through a momentary operation, to enable a lightweight operation and facilitate a user to perform a flexible interactive operation in the process of fighting against a target.

As an example, actions in which the posture after executing the action is different from the posture before executing the action include lying down and squatting. A trigger operation for a connection button is non-draggable and is a transient operation, for example, when the trigger operation is a click operation, the virtual object is controlled to execute an action associated with a target action button once. When the action is a lying down action or a squatting action, the posture of the virtual object before executing the action is restored, namely, the virtual object is restored to stand. When the posture after executing the action is the same as the posture before executing the action, for example, when the action is a jumping action, the posture has been restored to the posture before executing the action after completing the jumping action, namely, the action itself has the ability to restore. Therefore, it is not necessary to restore the virtual object to the posture before executing the action again, and the virtual object is controlled to perform an attack operation once using the attack prop starting from controlling the virtual object to execute the action associated with the target action button, where the view angle is unchanged in the whole process.

Figure 7A:
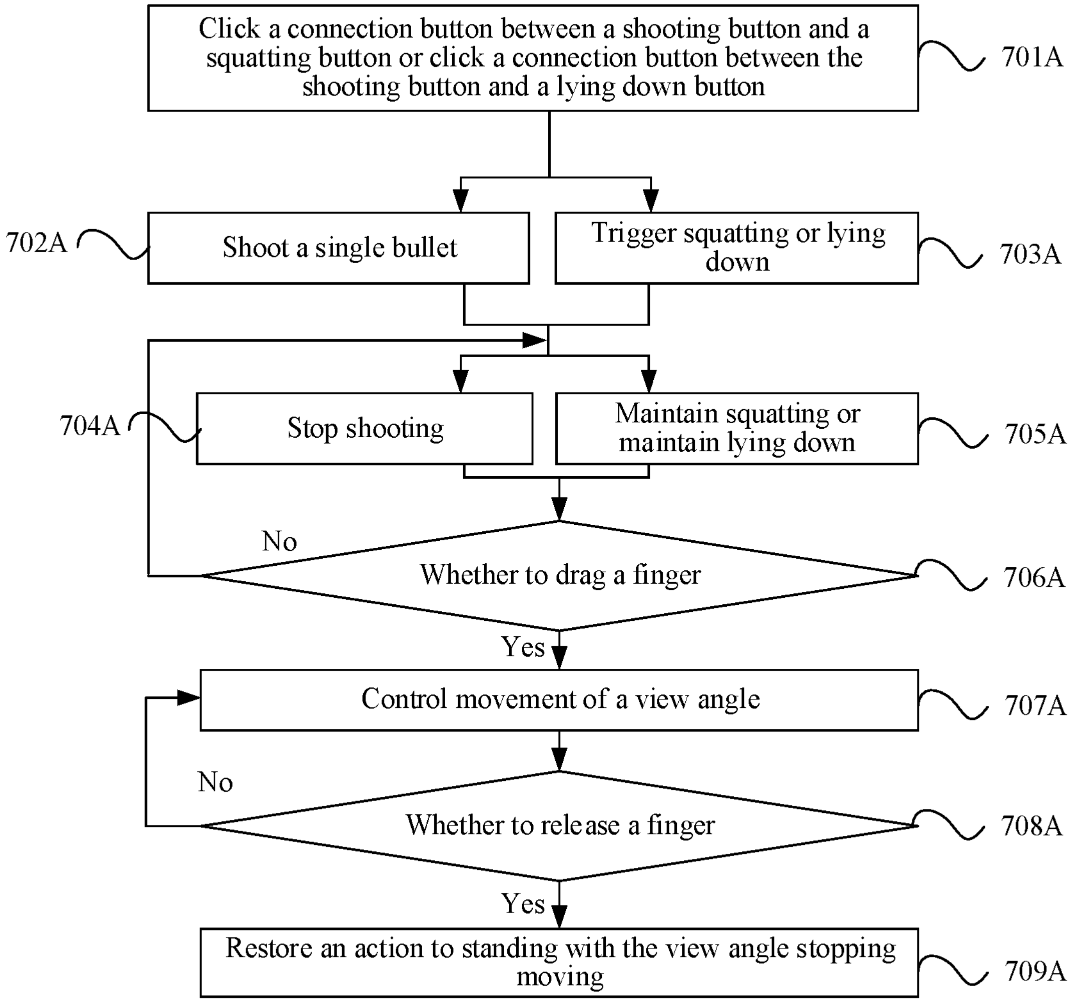
FIG. 7A to FIG. 7C are logic diagrams of an object control method for a virtual scene provided by an embodiment of this application.
Figure 7B:
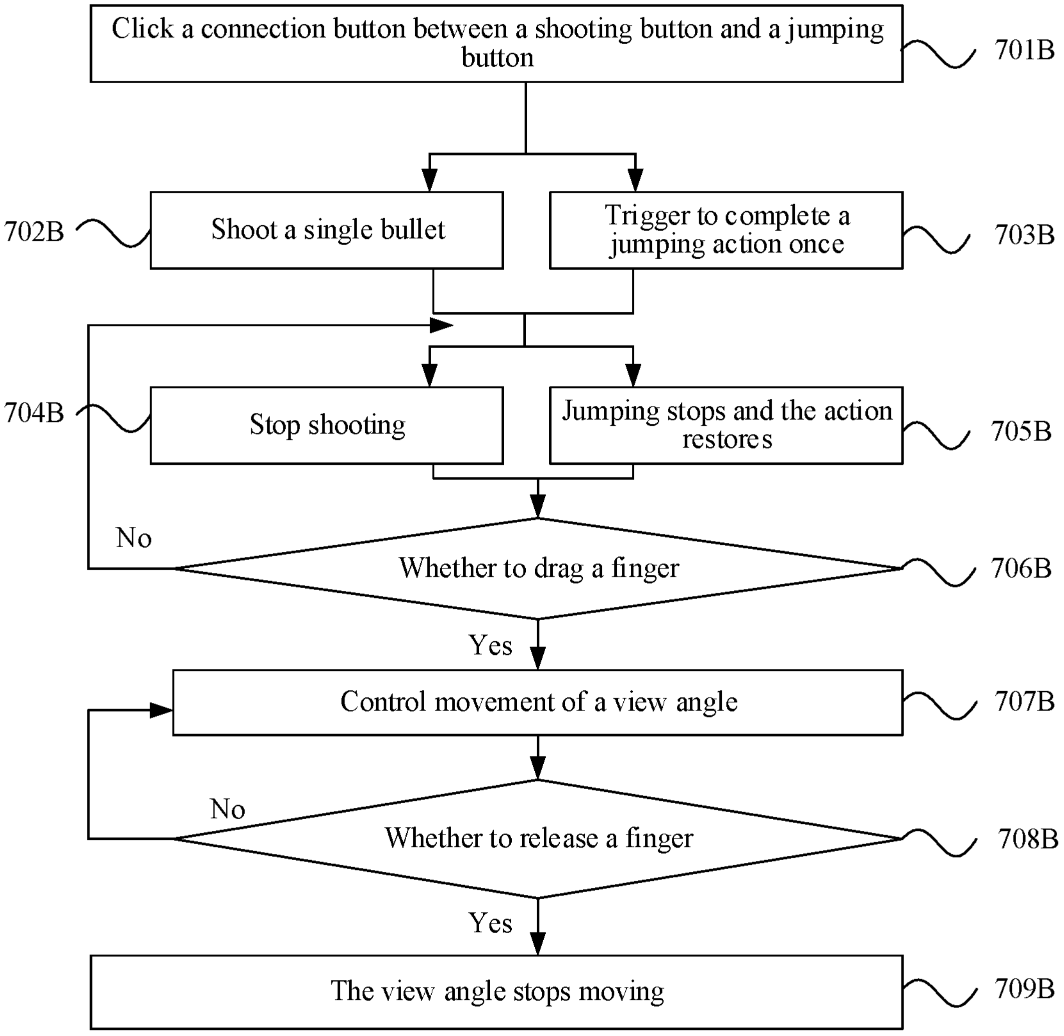
Figure 7C:
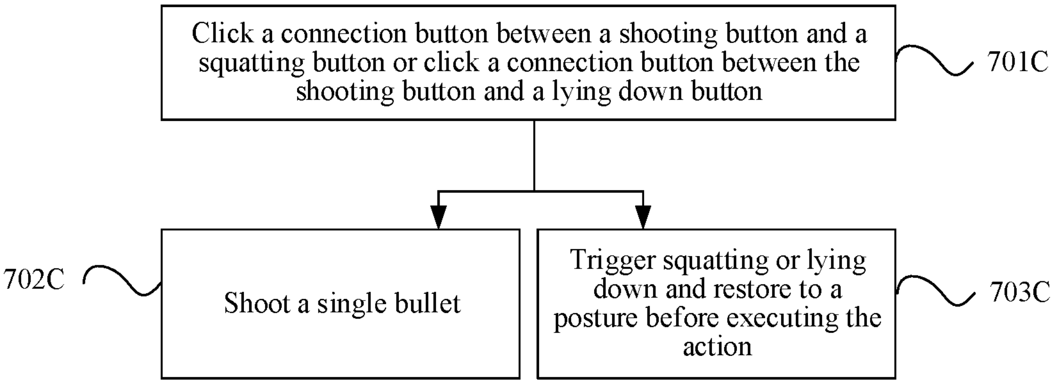

As an example, referring to FIG. 7C, FIG. 7C is a logic diagram of an object control method for a virtual scene provided by an embodiment of this application. Step 701C: Trigger a connection button between an attack button and a squatting action button, or trigger a connection button between an attack button and a lying down action button. Step 702C: Control the virtual object to perform a single shooting operation (shooting a single bullet) with step 703C synchronously performed. Step 703C: Restore the virtual object to a posture before executing the action after controlling the virtual object to complete a corresponding action. For example, restore the virtual object to the standing posture after squatting or lying down. Since the trigger operation is non-draggable and transient, no other actions will be performed after performing steps 702C and 703C.

In some embodiments, the trigger operation is a persistent operation for a target connection button. Before restoring the posture of the virtual object before executing the action, the posture after executing the action is maintained until the trigger operation is released. When the trigger operation generates a movement track, the view angle of the virtual scene is synchronously updated according to a direction and an angle of the movement track. In response to the trigger operation being released, the updating of the view angle of the virtual scene is stopped. In the related technology, the change of the visual field is realized through the direction button 302 in FIG. 1. In the embodiments of this application, a connection button is multiplexed; the updating of the view angle is realized by dragging on the connection button, thereby simplifying the operation difficulty of a user in the process of fighting, and improving the human-computer interaction efficiency and the operation efficiency.

As an example, the actions in which the posture after executing the action is different from the posture before executing the action include a lying down and a squatting. The trigger operation for the connection button is a continuous dragging operation, for example, the trigger operation is a pressing operation. Before restoring the posture of the virtual object before executing the action, when the posture after executing the action is different from the posture before executing the action, for example, the action is a lying down action or a squatting action, the posture of the lying down action or the squatting action is maintained until the trigger operation is released; and the trigger operation generates a movement track, namely, the trigger operation for the connection button is dragged, then the view angle of the virtual scene is synchronously updated according to the direction and the angle of the movement track; when the movement track is generated since the trigger operation is not released, the posture is maintained even if the movement track is generated when the posture after executing the action is different from the posture before executing the action. When the posture after executing the action is the same as the posture before executing the action, the posture before executing the action is maintained while the movement track is generated, for example, a standing posture is maintained; and in response to the trigger operation being released, the updating of the view angle of the virtual scene is stopped.

As an example, referring to FIG. 7A, FIG. 7A is a logic diagram of an object control method for a virtual scene provided by an embodiment of this application. When a virtual prop is in a single firing mode, the single firing mode referring to performing an attack operation only once for each triggering of a connection button, the following steps are performed. Step 701A: Trigger a connection button between an attack button and a squatting action button, or trigger a connection button between an attack button and a lying down action button. Step 702A: Control the virtual object to perform a single shooting operation (shooting a single bullet) with step 703A synchronously performed. Step 703A: Control the virtual object to complete a corresponding action, for example, squatting or lying down. Step 704A: Control the virtual object to no longer shoot on the basis of step 702A with step 705A synchronously performed. Step 705A: Control the virtual object to keep squatting or keep lying down on the basis of step 703A. Step 706A: Determine whether the trigger operation for the connection button generates a movement track, equivalent to determining whether a user drags the connection button to move. When not dragged, step 705A and step 704A are continued to perform; when dragged, step 707A is performed. Step 707A: Control the view angle of the virtual object to move according to the movement track of the trigger operation on the basis of step 705A and step 704A. Step 708A: Determine whether the trigger operation is stopped, namely, whether the user's finger is released. When the trigger operation is not stopped, step 707A is performed; when the trigger operation is stopped, step 709A is performed. Step 709A: Control the virtual object to restore the motion to standing with the view angle stopping moving.

In some embodiments, the attack prop is in a continuous attack mode. Controlling the virtual object to execute an action associated with the target action button, and controlling the virtual object to synchronously perform an attack operation using the attack prop in step 103 can be implemented by the following technical solutions: controlling the virtual object to execute the action associated with the target action button once when a posture after executing the action is different from a posture before executing the action, and maintaining the posture after executing the action; controlling the virtual object to execute the action associated with the target action button once when the gesture after executing the action is the same as the gesture before executing the action; controlling the virtual object to continuously perform an attack operation using the attack prop starting from controlling the virtual object to execute the action associated with the target action button; restoring, when the gesture after executing the action is different from the gesture before executing the action, the gesture of the virtual object before executing the action in response to the trigger operation being released, and stopping controlling the virtual object to continuously perform the attack operation using the attack prop; and stopping, when the gesture after executing the action is the same as the gesture before executing the action, controlling the virtual object to continuously perform the attack operation using the attack prop in response to the trigger operation being released; improving the attack efficiency of the user through a continuous attack; and maintaining the posture after executing the action in the process of the continuous attack, thereby effectively improving the attack effect.

In some embodiments, when the posture after executing the action is the same as the posture before executing the action, the virtual object may also be controlled to execute actions associated with the target action button several times until the trigger operation is released, for example, when the action is a jumping action, the virtual object may be controlled to complete the jumping action several times until the trigger operation is released, namely, the virtual object jumps continuously while keeping shooting.

As an example, actions of which the posture after executing the action is different from the posture before executing the action include at least one of the following: lying down and squatting. Actions of which the posture after executing the action is the same as the posture before executing the action include jumping. The trigger operation for the connection button is non-draggable and is a transient operation, for example, the trigger operation is a click operation. The attack can be stopped after a continuous attack is maintained within a set time; and the attack can also be stopped after a set number of attacks are continuously performed. Since the trigger operation is transient, the posture of the virtual object before executing the action is resumed; or the posture of the virtual object after the action is maintained before the end of the attack, and the posture of the virtual object before executing the action is resumed after the end of the attack. Since the trigger operation is not dragged, the view angle of the virtual scene does not change.

Figure 6A:
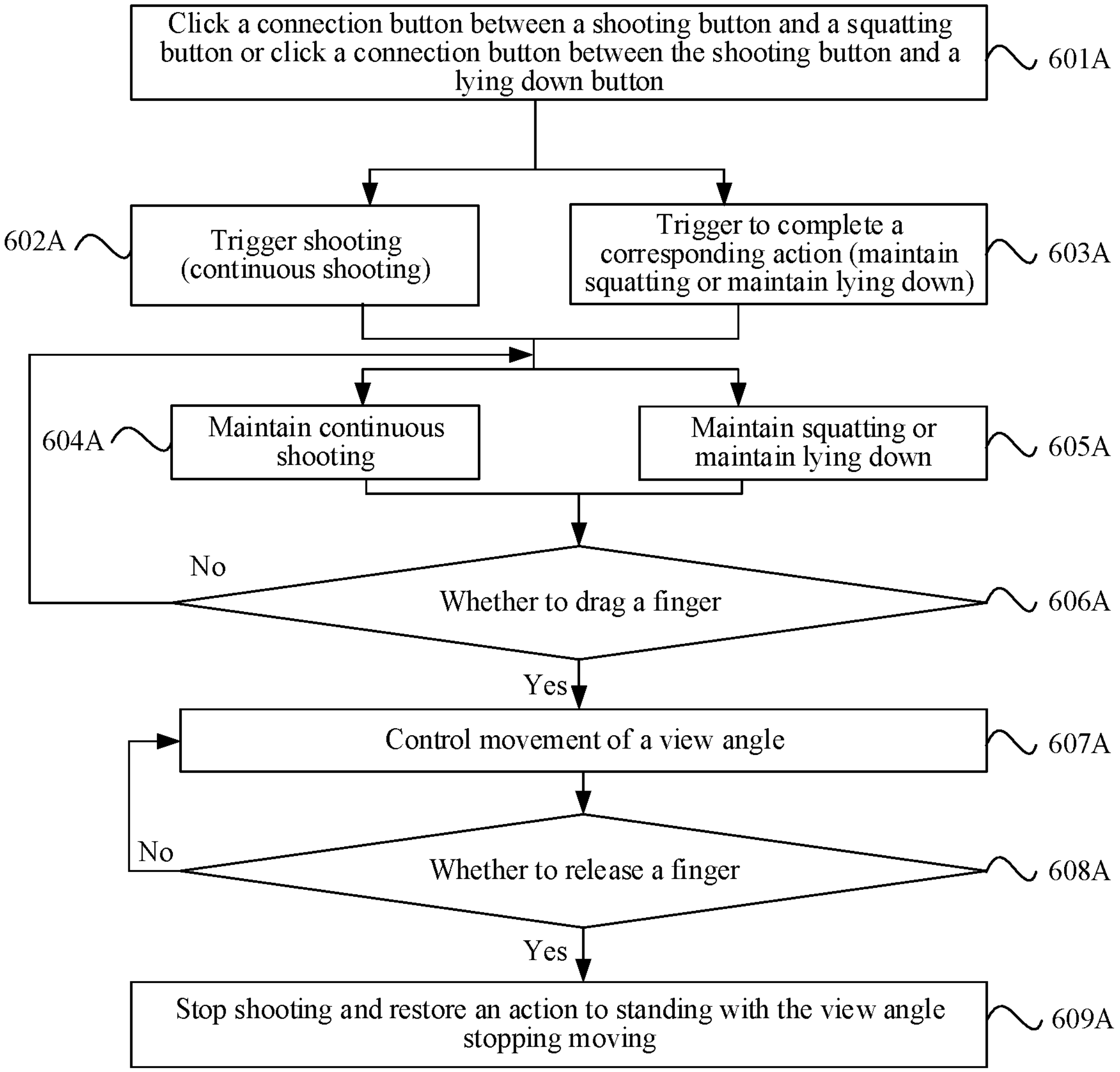
FIG. 6A to FIG. 6C are logic diagrams of an object control method for a virtual scene provided by an embodiment of this application.
Figure 6B:
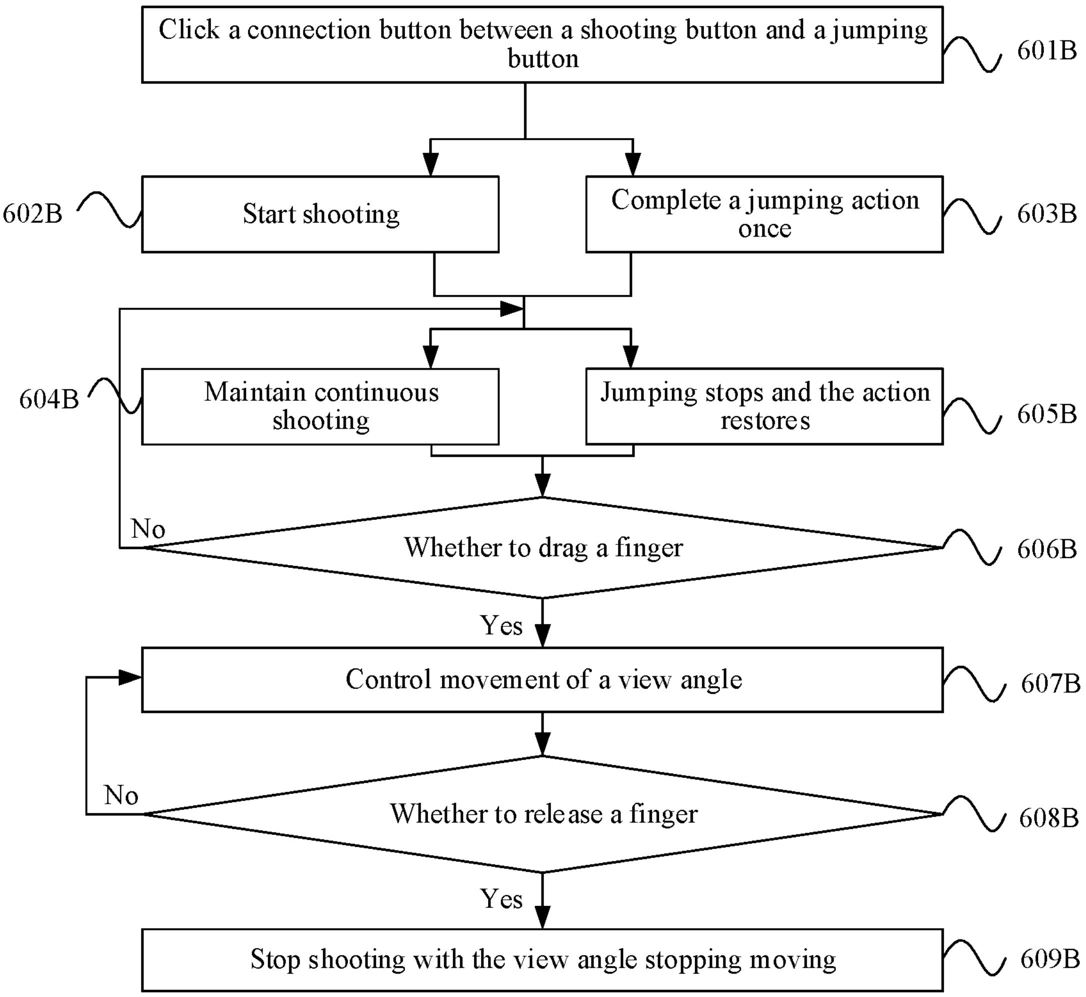
Figure 6C:
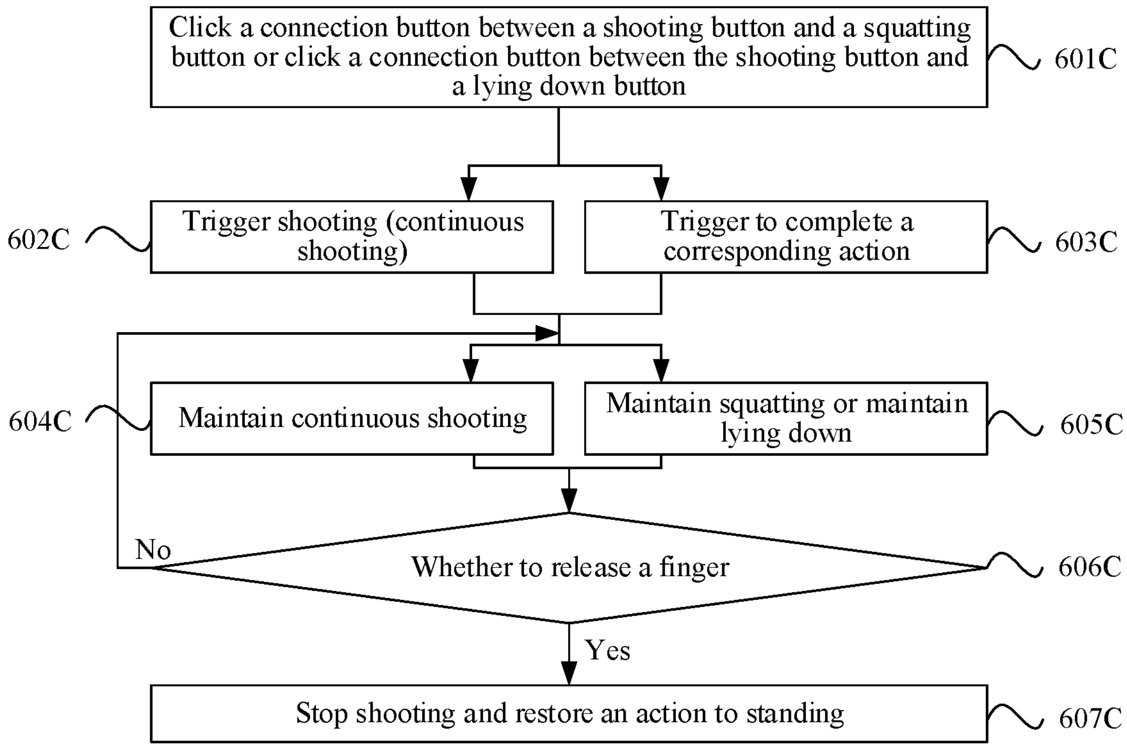

As an example, referring to FIG. 6C, FIG. 6C is a logic diagram of an object control method for a virtual scene provided by an embodiment of this application. When a virtual prop is in a continuous firing mode, the following steps are performed. Step 601C: Trigger a connection button between an attack button and a squatting action button, or trigger a connection button between an attack button and a lying down action button. Step 602C: Control the virtual object to perform a shooting operation with step 603C synchronously performed. Step 603C: Control the virtual object to complete a corresponding action, such as squatting or lying down. Step 604C: Control the virtual object to maintain a continuous shooting operation on the basis of step 602C with step 605C synchronously performed. Step 605C: Control the virtual object to maintain squatting or maintain lying down on the basis of step 603C. Step 606C: Determine whether the trigger operation is stopped, that is, whether the finger is released. When the trigger operation is stopped, step 607C is performed. Step 607C: Stop performing the shooting operation and restore the motion to standing.

In some embodiments, the trigger operation is a persistent operation for the target connection button, for example, a persistent press operation, synchronously updating, in response to the trigger operation generating a movement track, a view angle of the virtual scene according to a direction and an angle of the movement track. In response to the trigger operation being released, the updating of the view angle of the virtual scene is stopped. In the related technology, the change of the visual field is realized through the direction button 302 in FIG. 1. In the embodiments of this application, a connection button is multiplexed; the updating of the view angle is realized by dragging on the connection button, thereby simplifying the operation difficulty of a user in the process of fighting, and improving the human-computer interaction efficiency and the operation efficiency.

As an example, referring to FIG. 6A, FIG. 6A is a logic diagram of an object control method for a virtual scene provided by an embodiment of this application. When a virtual prop is in a continuous firing mode, the following steps are performed. Step 601A: Trigger a connection button between an attack button and a squatting action button, or trigger a connection button between an attack button and a lying down action button. Step 602A: Control the virtual object to perform a shooting operation with step 603A synchronously performed. Step 603A: Control the virtual object to complete a corresponding action, such as squatting or lying down. Step 604A: Control the virtual object to maintain a continuous shooting operation on the basis of step 602A with step 605A synchronously performed. Step 605A: Control the virtual object to maintain squatting or maintain lying down on the basis of step 603A. Step 606A: Determine whether the trigger operation for the connection button generates a movement track, namely, whether to drag a finger. When the finger is not dragged, step 605A and step 604A are performed; when the finger is dragged, step 607A is performed. Step 607A: Control the view angle of the virtual object to move according to the movement track of the trigger operation on the basis of step 605A and step 604A. Step 608A: Determine whether the trigger operation is stopped, that is, whether the finger is released. When the trigger operation is not stopped, step 607A is performed; when the trigger operation is stopped, step 609A is performed. Step 609A: Stop shooting and restore the action to standing with the view angle stopping moving.

In some embodiments, a working mode of the target action button includes a manual mode and a locking mode, the manual mode being used for stopping triggering the target connection button after the trigger operation is released, and the locking mode being used for continuing to automatically trigger the target action button after the trigger operation is released. Controlling the virtual object to execute an action associated with the target action button, and controlling the virtual object to synchronously perform an attack operation using the attack prop in step 103 can be implemented by the following technical solutions: controlling, when the trigger operation controls the target action button to enter the manual mode, the virtual object to execute the action associated with the target action button during the trigger operation is not released, and controlling the virtual object to synchronously perform the attack operation using the attack prop; and controlling, when the trigger operation controls the target action button to enter the locking mode, the virtual object to execute the action associated with the target action button during the trigger operation is not released and after the trigger operation is released, and controlling the virtual object to synchronously perform the attack operation using the attack prop; where through the locking mode, both hands of a user can be freed, and the attack can still be continued and corresponding actions can be executed even if the trigger operation is released, effectively improving the operation efficiency of the user.

As an example, during the period after the trigger operation is released, the attack may be stopped after a continuous attack is maintained for a continuous set time; the attack may be stopped after a set number of attacks are continuously performed; or when the trigger operation for the locking mode is received again, the controlling the virtual object to continuously perform the attack operation using the attack prop is stopped. The posture of the virtual object before executing the action is restored when the posture after executing the action is different from the posture before executing the action.

As an example, in an object control method for a virtual scene provided by the embodiments of this application, a connection button may be automatically and continuously triggered, namely, the connection button has, in addition to a manual mode, a locking mode. In the locking mode, when the connection button is triggered, the virtual object can automatically and repeatedly perform a compound action (such as a single shooting operation and a jumping operation) to reduce the operation difficulty. Taking the attack operation associated with a continuous button as a single shooting operation as an example, in response to the locking trigger operation for the continuous button, the single shooting operation is automatically and repeatedly performed and the jumping operation is automatically and repeatedly performed. For example, when the user presses the connection button for a preset duration, the pressing operation is determined as a locking trigger operation; the connection button is locked; even after the user releases a finger, the virtual object still maintains the action corresponding to the connection button, for example, continuously performing a single shooting and continuously jumping. In response to the operation of the user clicking the connection button again, the connection button is unlocked; and the virtual object releases the action corresponding to the connection button, for example, stopping performing a single shooting and stopping jumping. The locking of the connection button can facilitate the virtual object to continuously perform an attack and an action, thereby improving operation efficiency. Especially for single attack and single action, automatic continuous attack can be realized by locking the connection button, improving the operation efficiency.

In some embodiments, when a virtual scene is in a button setting state, the virtual scene being in the button setting state represents that the virtual scene is not in a war situation, so that a user can comfortably set a button. Each selected connection button is displayed according to a target display mode in response to a selection operation for at least one connection button. The target display mode is significantly different from a display mode of an unselected connection button. The following processing is performed for each selected connection button: hiding, when the connection button is in a disabled state, a disabled icon of the connection button in response to an on operation for the connection button, and marking the connection button as an on state; and displaying, when the connection button is in the on state, the disabled icon for the connection button in response to a disabled operation for the connection button, and marking the connection button as the disabled state; and setting and prompting the available state of the connection button by a user's personalized setting to improve the human-computer interaction efficiency and the degree of personalization, improving the user's operating efficiency.

Figure 8:
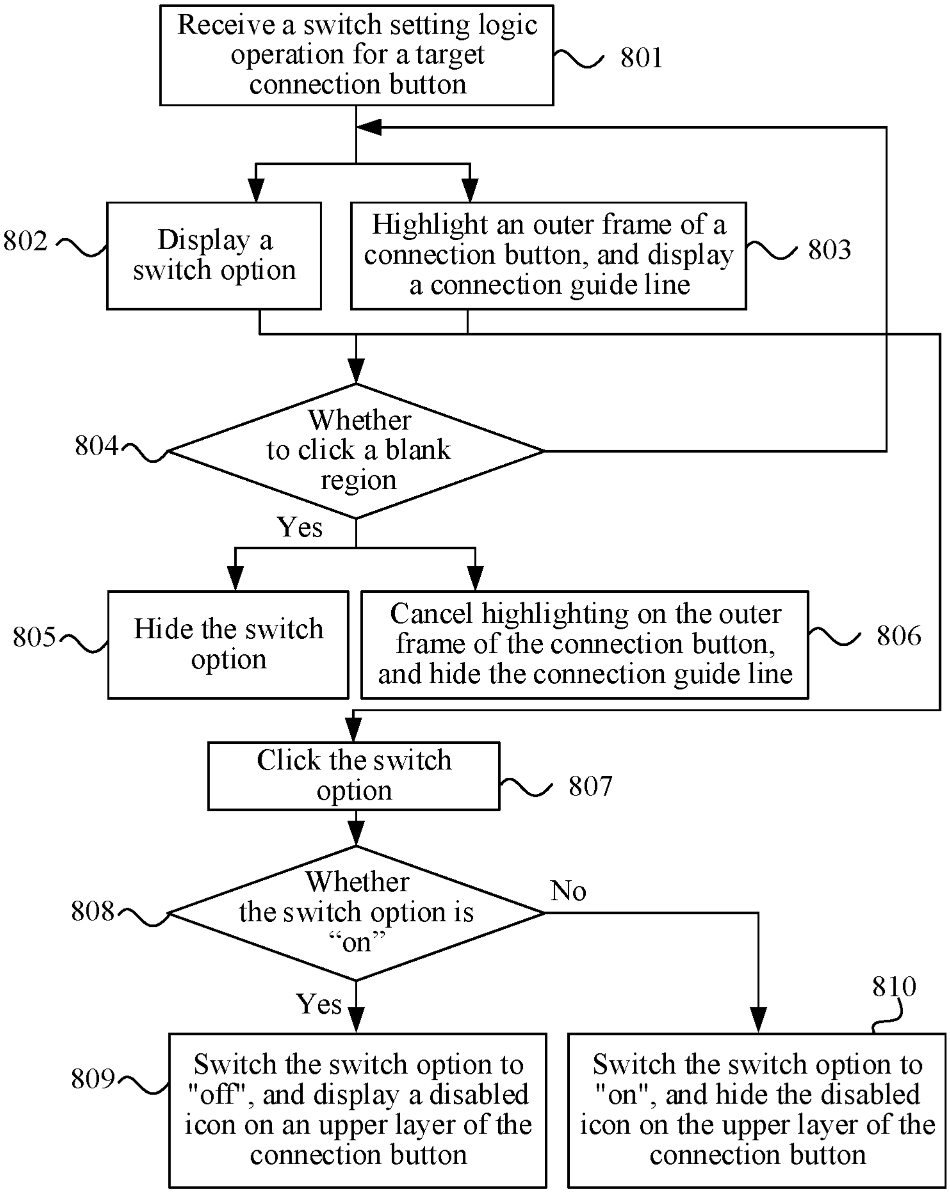
FIG. 8 is a logic diagram of an object control method for a virtual scene provided by an embodiment of this application.

As an example, referring to FIG. 8, FIG. 8 is a logic diagram of an object control method for a virtual scene provided by an embodiment of this application. Step 801: Receive a switch setting logic operation for a target connection button. Step 802: Display a switch option of the target connection button with step 803 synchronously performed. Step 803: Highlight an outer frame of the connection button, and display a connection guide line. Step 804: Determine whether a click operation for a blank region is received. If the click operation for the blank region is not received, steps 802 and 803 are continued to perform; if the click operation for the blank region is received, step 805 is performed. Step 805: Hide the switch option, and perform step 806. Step 806: Cancel highlighting on the outer frame of the connection button, and hide the connection guide line. Step 807 is performed after steps 802 and 803. Step 807: Receive a click operation for the switch option. Step 808: Determine whether the switch option is "on". When the switch option is "on", step 809 is performed. Step 809: Switch the switch option to "off", and display the disabled icon on an upper layer of the connection button. When the switch option is "off", step 810 is performed. Step 810: Switch the switch option to "on", and hide the disabled icon on the upper layer of the connection button.

In the following, exemplary applications of the embodiments of this application in a practical application scene will be described.

During a terminal running a client (for example, a standalone version of a game application), the terminal outputs a virtual scene including role-playing during the running process of the client, where the virtual scene is an environment for a game character to interact with, for example, may be a plain, a street, a valley, and the like for the game character to fight. The virtual scene includes a virtual object, a connection button, an action button, and an attack button. The virtual object may be a game character controlled by a user (or called a user), namely, the virtual object is controlled by a real user, and will move in the virtual scene in response to the operation of the real user for a controller (including a touch screen, a sound control switch, a keyboard, a mouse, a rocker, and the like). For example, when the real user moves the rocker to the left, the virtual object will move to the left part in the virtual scene; the virtual object is controlled to execute an action in the virtual scene in response to a trigger operation for the action button; the virtual object is controlled to perform an attack operation in the virtual scene in response to a trigger operation for the attack button; and the virtual object is controlled to execute an action and synchronously perform an attack operation in response to a trigger operation for the connection button.

The following is illustrated with the attack button as a shooting button and the attack operation as a shooting operation. The attack operation is not limited to the shooting operation; the attack button may also be applied as a button using other attack props, for example, different attack props can be used for attacking, where the attack props include at least one of the following: a pistol, a crossbow, and a torpedo. An attack button displayed in a human-computer interaction interface is associated with an attack prop currently held by a virtual object by default; and when the virtual prop held by the virtual object is switched from the pistol to the crossbow, the virtual prop associated with the attack button is automatically switched from the pistol to the crossbow.

Referring to FIG. 1, in a default layout of a human-computer interaction interface 301 of a virtual scene, three action buttons 304 are displayed around the right side of an attack button 303; and the three action buttons correspond to a squatting action, a lying down action, and a jumping action, respectively. Referring to FIG. 5A, a connection button 502A is displayed in a human-computer interaction interface 501A; and three connection buttons 502A are displayed between an attack button 503A and three action buttons 504A in response to a trigger operation of a user for the connection button 502A, that is, the virtual object 505A can be controlled by one-touch to complete a shooting operation and a corresponding action at the same time. For example, an action button 504A corresponding to a connection button 502A triggered in FIG. 5A is used for controlling the virtual object 505A to perform a squatting action, that is, the virtual object 505A can be controlled by one-touch to perform a shooting operation and a squatting action at the same time; the virtual object can be controlled to perform an attack operation alone in response to a trigger operation of the user for the attack button 503A; and the virtual object can be controlled to perform a squatting action alone in response to a trigger operation of the user for the action button 504A.

As an example, with the attack button as an origin point, it is also possible to connect the attack button with more action buttons. For example, a connection button between a shooting button and a mirror button, a shooting operation and a mirror operation are synchronously performed in response to a trigger operation for the connection button; a connection button between a shooting button and a probe button, a shooting operation and a probe operation are synchronously performed in response to a trigger operation for the connection button; and a connection button between a shooting button and a shovel button, a shooting operation and a shovel operation are synchronously performed in response to a trigger operation for the connection button.

Figure 5B:
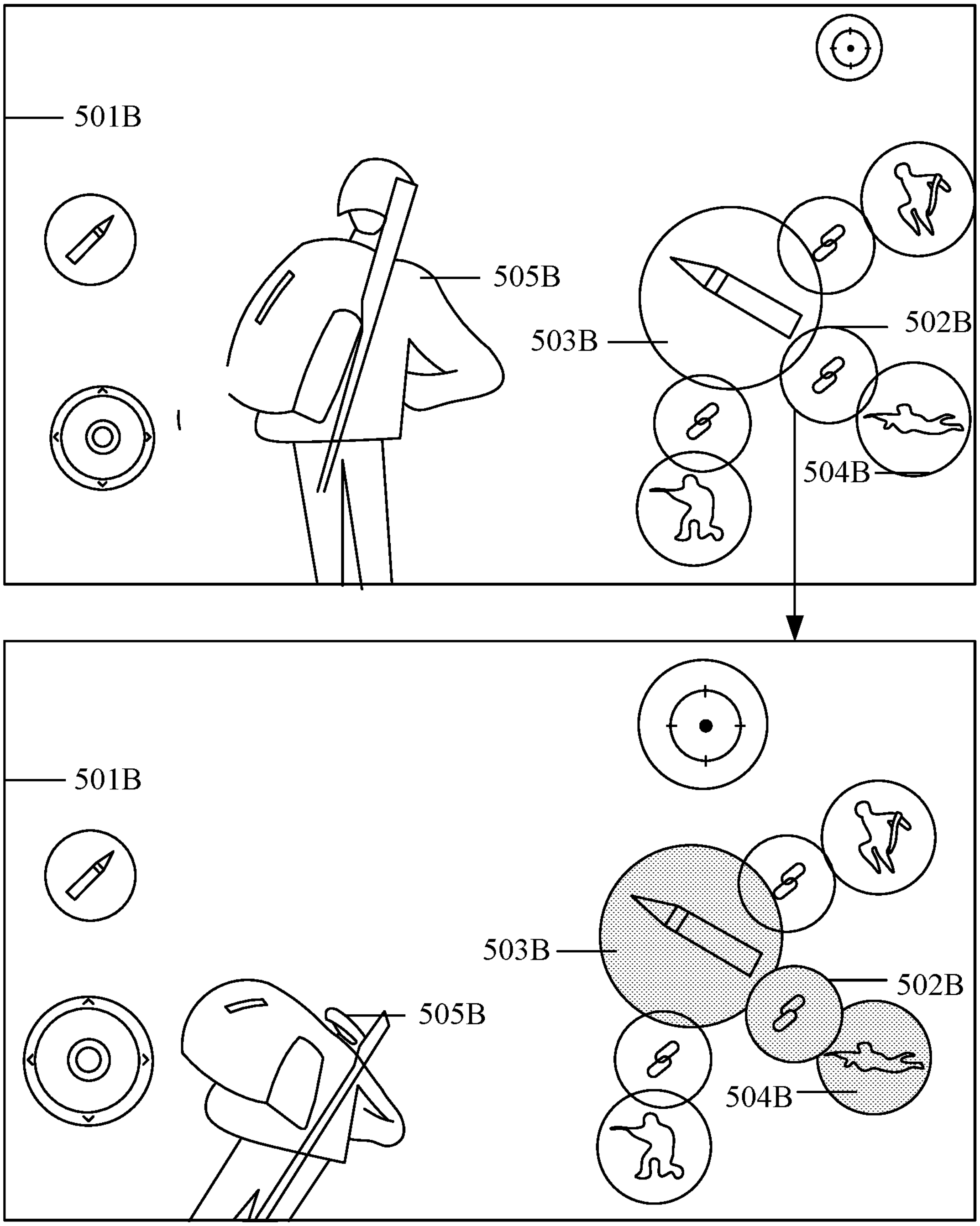

Referring to FIG. 5B, FIG. 5B is a diagram of a display interface of an object control method for a virtual scene provided by an embodiment of this application. A connection button 502B is displayed in a human-computer interaction interface 501B; the connection button 502B is used for connecting an attack button 503B and an action button 504B; when the action button 504B is triggered, the virtual object will perform a lying down movement. The connection button 502B is displayed between the attack button 503B and the action button 504B in response to a trigger operation of the user for the connection button 502B, that is, a virtual object 505B can be controlled by one-touch to simultaneously complete a shooting operation and a lying down action; the virtual object 505B can be controlled to perform an attack operation alone in response to a trigger operation of the user for the attack button 503B; and the virtual object can be controlled to perform the lying down action alone in response to a trigger operation of the user for the action button 504B.

Figure 5C:
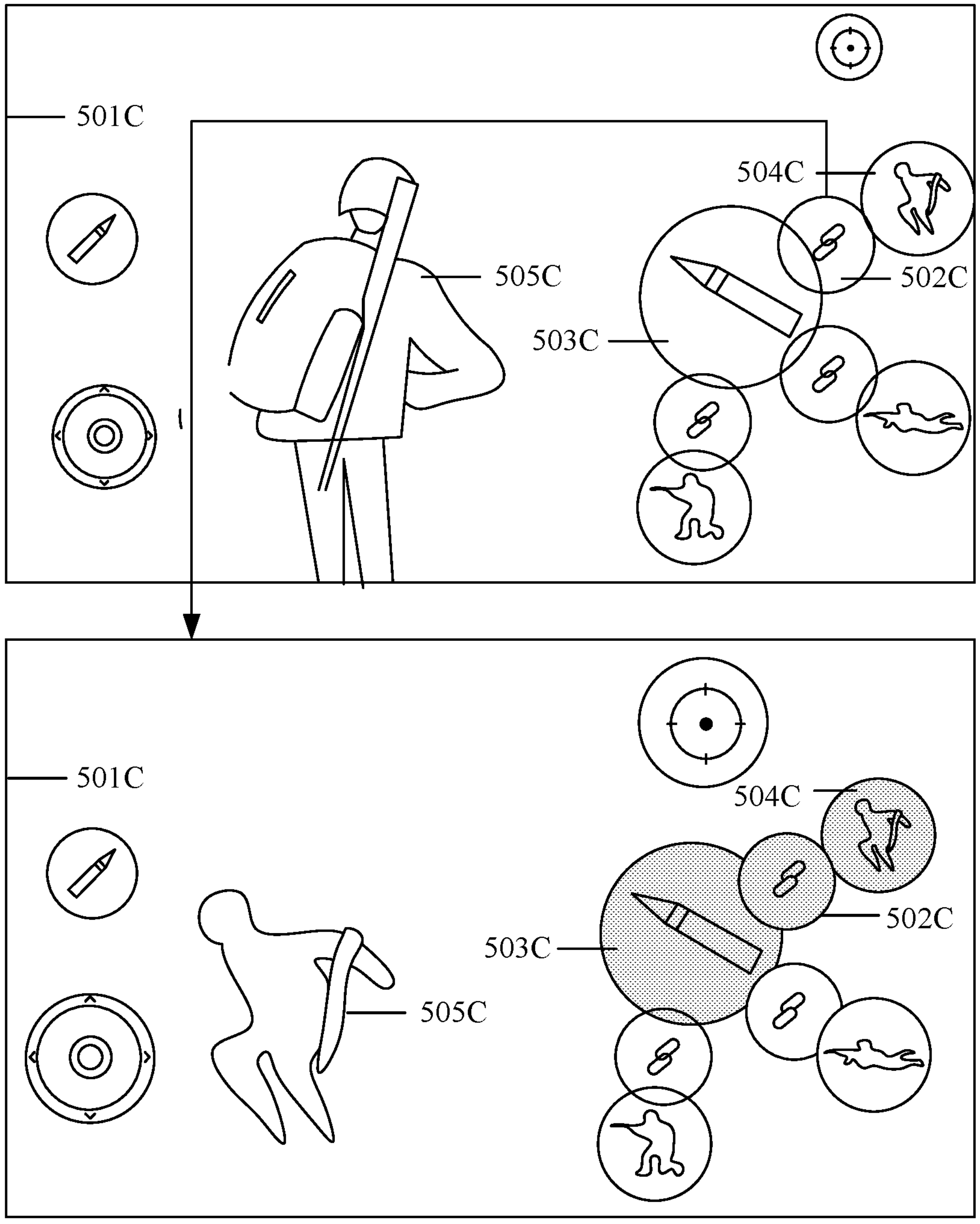
Figure 5D:
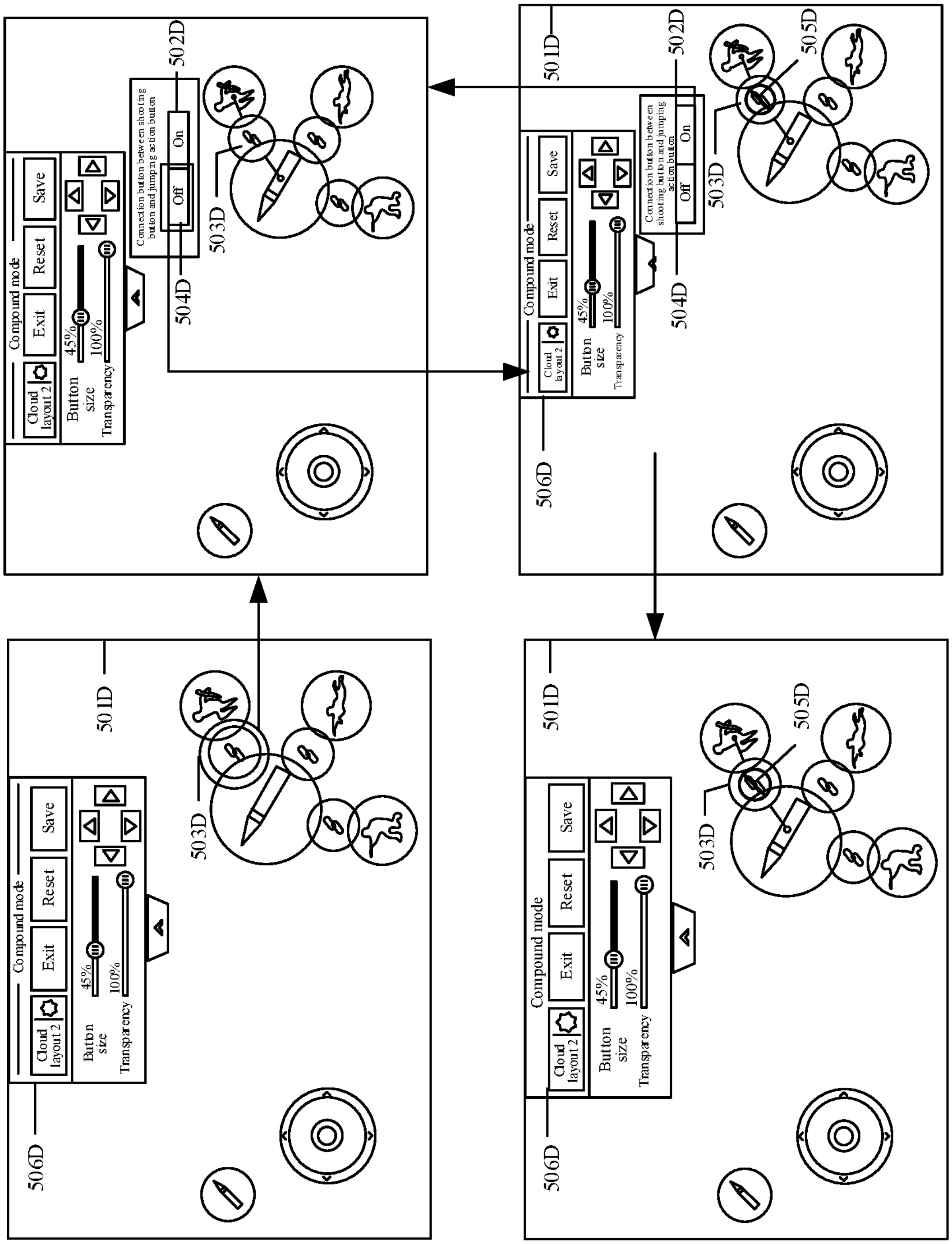
Figure 5E:
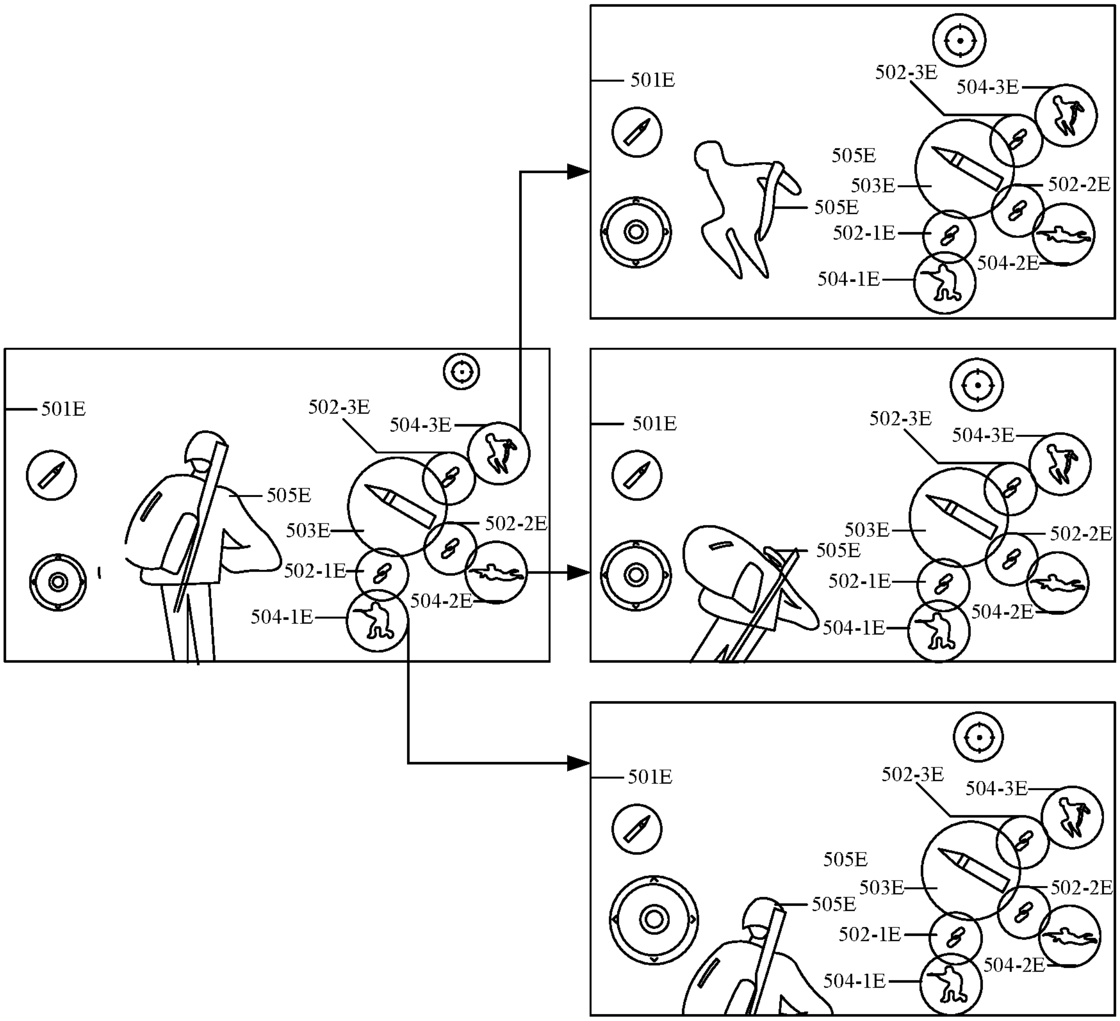

Referring to FIG. 5C, FIG. 5C is a diagram of a display interface of an object control method for a virtual scene provided by an embodiment of this application. A connection button 502C is displayed in a human-computer interaction interface 501C; the connection button 502C is displayed between an attack button 503C and an action button 504C in response to a trigger operation of the user for the connection button 502C, that is, a virtual object 505C can be controlled by one-touch to simultaneously complete a shooting operation and a jumping action; and the virtual object is controlled to perform the jumping action alone in response to a trigger operation of the user for the action button 504C.

Referring to FIG. 5E, a squatting action button 504-1E, a lying down action button 504-2E, and a jumping action button 504-3E are displayed in a human-computer interaction interface 501E; an attack button 503E is also displayed in the human-computer interaction interface 501E. A squatting connection button 502-1E is displayed between the attack button 503E and the squatting action button 504-1E; a lying down connection button 502-2E is displayed between the attack button 503E and the lying down action button 504-2E; and a jumping connection button 502-3E is displayed between the attack button 503E and the jumping action button 504-3E. The virtual object 505E is controlled to perform an attack operation alone in response to a trigger operation of the user for the attack button 503E; the virtual object is controlled to perform a squatting action alone in response to a trigger operation of the user for the squatting action button 504-1E; the virtual object is controlled to perform a lying down action alone in response to a trigger operation of the user for the lying down action button 504-2E; and the virtual object is controlled to perform a jumping action alone in response to a trigger operation of the user for the jumping action button 504-3E.

Referring to FIG. 5D, a user can separately control whether a connection button is on or not in a customized setting. A button customized interface 506D is displayed in a human-computer interaction interface 501D, at this moment, characterizing the user can perform a customized setting for a button in the human-computer interaction interface 501D. In response to a trigger operation of the user for any connection button 503D, an on button 502D and an off button 504D are displayed above the connection button 503D; and the on button 502D and the off button 504D can control the on and off of the connection button 503D, namely, controlling the connection button 503D to be displayed or hidden in the process of a confrontation. Only one button between the on button and the off button is in an operable state. Referring to FIG. 5D, the on button 502D is displayed as an operable state, and a disabled icon 505D is displayed on the connection button 503D in response to a trigger operation for the off button 504D; the off button 504D is displayed as an operable state, and the disabled icon 505D is hidden on the connection button 503D in response to a trigger operation for the on button 502D; and after displaying the disabled icon 505D on the connection button 503D, the on button 502D and the off button 504D are hidden in response to a trigger operation for a blank region of the human-computer interaction interface 501D.

Referring to FIG. 6A, when a virtual prop is in a continuous firing mode, the following steps are performed. Step 601A: Trigger a connection button between an attack button and a squatting action button, or trigger a connection button between an attack button and a lying down action button. Step 602A: Control the virtual object to perform a shooting operation with step 603A synchronously performed. Step 603A: Control the virtual object to complete a corresponding action, such as squatting or lying down. Step 604A: Control the virtual object to maintain a continuous shooting operation on the basis of step 602A with step 605A synchronously performed. Step 605A: Control the virtual object to maintain squatting or maintain lying down on the basis of step 603A. Step 606A: Determine whether the trigger operation for the connection button generates a movement track, namely, whether to drag a finger. When the finger is not dragged, step 605A and step 604A are performed; when the finger is dragged, step 607A is performed. Step 607A: Control the view angle of the virtual object to move according to the movement track of the trigger operation on the basis of step 605A and step 604A. Step 608A: Determine whether the trigger operation is stopped, that is, whether the finger is released. When the trigger operation is not stopped, step 607A is performed; when the trigger operation is stopped, step 609A is performed. Step 609A: Stop shooting and restore the action to standing with the view angle stopping moving.

As an example, in a continuous shooting firing mode of a weapon, an operation of a user clicking a connection button between an attack button and a squatting action button is received, or an operation of a user clicking a connection button between an attack button and a lying down action button is received. The user clicking the connection button is equivalent to triggering continuous shooting and action operations at the same time, starting shooting and completing a corresponding squatting or lying down action at the same time. If the user keeps pressing the connection button without releasing the finger, the continuous firing will be kept triggered and the action will be maintained; the user keeps pressing the connection button and dragging the finger to control the movement of the view angle on the basis of keeping triggering continuous shooting and keeping action; if the user does not release the finger, continuous shooting and squatting or lying down action will be kept; if the user releases the finger, shooting will be stopped, the action restores from squatting or lying down to standing, and the view angle stops moving.

Referring to FIG. 6B, FIG. 6B is a logic diagram of an object control method for a virtual scene provided by an embodiment of this application. When a virtual prop is in a continuous firing mode, the following steps are performed. Step 601B: Trigger a connection button between an attack button and a jumping action button. Step 602B: Control the virtual object to perform a shooting operation with step 603B synchronously performed. Step 603B: Control the virtual object to complete a single jumping action. Step 604B: Control the virtual object to maintain a continuous shooting operation on the basis of step 602B with step 605B synchronously performed. Step 605B: Control the virtual object to stop jumping on the basis of Step 603B and restore the action to a standing state. Step 606B: Determine whether the trigger operation for the connection button generates a movement track, namely, whether to drag a finger. When the finger is not dragged, step 605B and step 604B are performed; when the finger is dragged, step 607B is performed. Step 607B: Control the view angle of the virtual object to move according to the movement track of the trigger operation on the basis of step 605B and step 604B. Step 608B: Determine whether the trigger operation is stopped, that is, whether the finger is released. When the trigger operation is not stopped, step 607B is performed; when the trigger operation is stopped, step 609B is performed. Step 609B: Stop shooting with the view angle stopping moving.

As an example, in a continuous shooting firing mode of a weapon, an operation of a user clicking a connection button between an attack button and a jumping action button is received. The user clicking the connection button is equivalent to triggering continuous firing and action operations at the same time, starting shooting while completing a single jumping action and restoring to a standing state. If the user keeps pressing the connection button without releasing the finger, the continuous shooting operation is kept triggered; however, after the single jumping action is finished, the character action restores to standing without repeatedly triggering the jumping action. The user keeps pressing the connection button and dragging the finger to control the movement of the view angle on the basis of keeping triggering continuous shooting and keeping the action. If the jumping action has ended, the movement of the view angle is controlled at the same time on the basis of controlling the continuous shooting; if the user does not release the finger, the continuous shooting will be kept with the subsequent jumping action stopping triggering; and if the user releases the finger, the continuous shooting will be stopped, and the view angle stops moving.

Referring to FIG. 7A, FIG. 7A is a logic diagram of an object control method for a virtual scene provided by an embodiment of this application. When a virtual prop is in a single firing mode, the following steps are performed. Step 701A: Trigger a connection button between an attack button and a squatting action button, or trigger a connection button between an attack button and a lying down action button. Step 702A: Control the virtual object to perform a single shooting operation (shooting a single bullet) with step 703A synchronously performed. Step 703A: Control the virtual object to complete a corresponding action, such as squatting or lying down. Step 704A: Control the virtual object to stop shooting on the basis of step 702A with step 705A synchronously performed. Step 705A: Control the virtual object to maintain squatting or maintain lying down on the basis of step 703A. Step 706A: Determine whether the trigger operation for the connection button generates a movement track, namely, whether to drag a finger. When the finger is not dragged, step 705A and step 704A are performed; when the finger is dragged, step 707A is performed. Step 707A: Control the view angle of the virtual object to move according to the movement track of the trigger operation on the basis of step 705A and step 704A. Step 708A: Determine whether the trigger operation is stopped, that is, whether the finger is released. When the trigger operation is not stopped, step 707A is performed; when the trigger operation is stopped, step 709A is performed. Step 709A: Restore the action to standing with the view angle stopping moving.

As an example, in a single shooting firing mode of a weapon, an operation of a user clicking a connection button between an attack button and a squatting action button is received, or an operation of a user clicking a connection button between an attack button and a lying down action button is received. The user clicking the connection button is equivalent to triggering a single shooting and action operations at the same time, starting to complete a single shooting and a corresponding squatting or lying down action at the same time. If the user keeps pressing the connection button without releasing the finger, shooting is not triggered again after completing the single shooting, only keeping the squatting or lying down action continuously triggered. The user keeps pressing the connection button and dragging the finger to control the movement of the view angle on the basis of single shooting and keeping the action; if the single shooting has been completed, the user only controls the movement of the view angle on the basis of keeping the action. If the user does not release the finger, the movement of the view angle is controlled while maintaining the squatting or lying down action, stopping shooting after the completion of the single shooting without triggering shooting again; if the user releases the finger, the squatting or lying down action of the virtual object restores to the standing action, and the view angle stops moving.

Referring to FIG. 7B, when a virtual prop is in a single firing mode, the following steps are performed. Step 701B: Trigger a connection button between an attack button and a jumping action button. Step 702B: Control the virtual object to perform a shooting operation (shooting a single bullet) with step 703B synchronously performed. Step 703B: Control the virtual object to complete a single jumping action. Step 704B: Control the virtual object to stop shooting on the basis of step 702B with step 705B synchronously performed. Step 705B: Control the virtual object to stop jumping on the basis of step 703B and restore the action to a standing state. Step 706B: Determine whether the trigger operation for the connection button generates a movement track, namely, whether to drag a finger. When the finger is not dragged, step 705B and step 704B are performed; when the finger is dragged, step 707B is performed. Step 707B: Control the view angle of the virtual object to move according to the movement track of the trigger operation on the basis of step 705B and step 704B. Step 708B: Determine whether the trigger operation is stopped, that is, whether the finger is released. When the trigger operation is not stopped, step 707B is performed; when the trigger operation is stopped, step 709B is performed. Step 709B: The view angle stops moving.

As an example, in a single shooting firing mode of a weapon, an operation of a user clicking a connection button between an attack button and a jumping action button is received. The user clicking the connection button is equivalent to triggering a single shooting and an action operation at the same time, starting the single shooting and completing a single jumping action at the same time and restoring to a standing state. Even if the user continues to press the connection button, shooting is not triggered again after the single shooting is completed; after the single jumping action is finished, the virtual object action restores to standing, and the jumping action is not triggered repeatedly. The user keeps pressing the connection button and dragging the finger to trigger a single shooting and controls the movement of the view angle at the same time on the basis of keeping the action. If the single shooting and the jumping action have ended, only the view angle is controlled to move; and if the user releases the finger, the view angle stops moving.

Referring to FIG. 8, the following steps are performed. Step 801: Receive a switch setting logic operation for a target connection button. Step 802: Display a switch option of the target connection button with step 803 synchronously performed. Step 803: Highlight an outer frame of the connection button, and display a connection guide line. Step 804: Determine whether a click operation for a blank region is received. If the click operation for the blank region is not received, steps 802 and 803 are continued to perform; if the click operation for the blank region is received, step 805 is performed. Step 805: Hide a switch option, and perform step 806. Step 806: Cancel highlighting on the outer frame of the connection button, and hide the connection guide line. Step 807 is performed after steps 802 and 803. Step 807: Receive a click operation for the switch option. Step 808: Determine whether the switch option is "on". When the switch option is "on", step 809 is performed. Step 809: Switch the switch option to "off", and display the disabled icon on the upper layer of the connection button. When the switch option is "off", step 810 is performed. Step 810: Switch the switch option to "on", and hide the disabled icon on the upper layer of the connection button.

As an example, after receiving a switch setting logic operation for a target connection button, a human-computer interaction interface is in a layout setting state. In response to a trigger operation for any connection button, a switch option is displayed above the corresponding connection button, and at the same time, an outer frame of the triggered connection button is highlighted and a connection guide line is displayed; at this time, the switch option can be hidden in response to a blank region, and at the same time, the outer frame of the previously triggered connection button is unhighlighted and the guide line is hidden. In response to the trigger operation for the switch option, if the switch option is "on", the switch option is switched to "off"; and at the same time, the upper layer of the connection button displays a disabled icon or does not display the connection button, representing that the function of the connection button is not turned on and cannot be used in the war or cannot be perceived in the war; the switch settings of the connection button may be set in batches or by targeted settings. In response to a trigger operation for the switch option, if the switch option is "off", the switch option is switched to "on"; and the disabled icon is hidden on the connection button, representing that the function of the connection button is activated and can be used in the war or can be perceived in the war.

In some embodiments, an object control method for a virtual scene provided by an embodiment of this application provides an adjustment function of the action button; a replacement function of the action button is provided in the process of fighting against a virtual scene; an action associated with the action button is replaced with other actions so as to flexibly switch various actions. A connection button is displayed in a human-computer interaction interface; the connection button is used for connecting an attack button and the action button; the attack button is associated with a virtual prop currently held by the virtual object by default; and in response to a replacement operation for the action button, a plurality of candidate key position contents to be replaced are displayed. When the key position content of the action button is a squatting action, the selected candidate key position content is updated to the action button to replace the squatting action in response to a selection operation for a plurality of candidate actions to be replaced, namely, supporting replacing the key position content of the action button being a squatting action with a lying down action, and may also be replaced with a probe. A combined attack mode of a shooting operation and a probe operation can be realized, so that a plurality of action combinations can be realized without occupying an excessive display region, thereby realizing a plurality of combined attack modes.

In some embodiments, the object control method for a virtual scene provided by the embodiments of this application provides a function of preventing a false touch, and confirms that a current trigger operation is an effective trigger operation by the set pressing times, pressing time, and pressing pressure. For example, the virtual object is controlled to perform a compound action corresponding to the connection button A when the pressing times for a trigger operation of a connection button A is greater than a set pressing times for an action button corresponding to the connection button A, or when the pressing time for a trigger operation of the connection button A is greater than a set pressing time for an action button corresponding to the connection button A, or when the pressing pressure for a trigger operation of the connection button A is greater than a set pressing pressure for an action button corresponding to the connection button A, thereby preventing a user from erroneously touching the connection button.

In some embodiments, the object control method for a virtual scene provided by the embodiments of this application provides various forms of a connection button. Referring to FIG. 9A, a connection button 902A is displayed in a human-computer interaction interface 901A; the connection button 902A is used for connecting an attack button 903A and an action button 904A; and the connection button 902A is arranged between the attack button 903A and the action button 904A and partially overlaps a display region of the attack button 903A and the action button 904A. Referring to FIG. 9B, FIG. 9B is a diagram of a display interface of an object control method for a virtual scene provided by an embodiment of this application. A connection button 902B is displayed in a human-computer interaction interface 901B; the connection button 902B is used for connecting an attack button 903B and an action button 904B; the connection button 902B is arranged between the attack button 903B and the action button 904B and has no overlap with a display region of the attack button 903B and the action button 904B; and the connection button 902B is connected to the attack button 903B and the action button 904B via a line.

In some embodiments, the object control method for a virtual scene provided by the embodiments of this application provides different display opportunities for a connection button; for example, the connection button may be displayed all the time; for example, the connection button may be displayed on demand, namely, the connection button switches from a non-display state to a display state. The condition for displaying on demand includes at least one of the following: The group to which the virtual object belongs interacts with other groups. The distance between a virtual object and other virtual objects of other groups is less than a distance threshold. For example, a connection button may be highlighted on demand, namely, being highlighted in the case of always displaying, for example, a dynamic effect of the connection button is displayed. The condition for highlighting includes at least one of the following: the group to which the virtual object belongs interacting with other groups; and a distance between the virtual object and other virtual objects of other groups being less than the distance threshold.

In some embodiments, in an object control method for a virtual scene provided by the embodiments of this application, a connection button may be automatically and continuously triggered; the connection button has a manual mode and a locking mode. In the locking mode, when the connection button is triggered, the virtual object can automatically and repeatedly perform a compound action (a single shooting operation and a jumping operation) to reduce the operation difficulty. Taking the attack operation associated with a continuous button as a single shooting operation as an example, in response to the locking trigger operation for the continuous button, the single shooting operation is automatically and repeatedly performed and the jumping operation is automatically and repeatedly performed. For example, when the user presses the connection button for a preset duration, the pressing operation is determined as a locking trigger operation; the connection button is locked; even after the user releases a finger, the virtual object still maintains the action corresponding to the connection button, for example, continuously performing a single shooting and continuously jumping. In response to the operation of the user clicking the connection button again, the connection button is unlocked; and the virtual object releases the action corresponding to the connection button, for example, stopping performing a single shooting and stopping jumping. The locking of the connection button can facilitate the virtual object to continuously perform an attack and an action, thereby improving operation efficiency. Especially for single attack and single action, automatic continuous attack can be realized by locking the connection button, improving the operation efficiency.

The manual mode and the locking mode may be switched on the basis of an operation parameter, namely, may be triggered on the basis of different operation parameters of the same type of operation. Taking the operation as a pressing operation as an example, for example, when the pressing times of the trigger operation for the connection button A is greater than a set pressing times, or when the pressing time of the trigger operation for the connection button A is greater than a set pressing time, or when the pressing pressure of the trigger operation for the connection button A is greater than a set pressing pressure, the connection button is determined to be in the locking mode, that is, the connection button is locked. Otherwise, the connection button is in the manual mode. The manual mode and the locking mode may also be triggered based on different types of operations, for example, the connection button is determined to be in the manual mode when the trigger operation for the connection button A is a click operation; and the connection button is determined to be in the locking mode when the trigger operation for the connection button A is a slide operation.

The object control method for a virtual scene provided by the embodiments of this application supports the addition of three connection buttons. Each connection button is used for corresponding to a shooting button and each action button, for example, corresponding to a connection button between a shooting button and a squatting action button; corresponding to a connection button between a shooting button and a lying down action button; corresponding to a connection button between a shooting button and a jumping action button. The above helps a user quickly complete an operation by one-touch which originally needs to click two buttons at the same time, and can also control the movement of a view angle at the same time; various attack actions are realized with low learning cost and easy operation. It has a wide application prospect in the field of virtual scene interaction.

In order to reduce the learning difficulty of operations and enable more users to quickly master different types of attack operations, the object control method for a virtual scene provided by the embodiments of this application provides a connection button, and the connection form thereof is to combine a shooting button and three action buttons into three connection buttons. Clicking the connection button triggers a shooting operation and a corresponding action at the same time to achieve the effect of clicking one button to trigger two functions at the same time, for example, clicking the connection button between the shooting button and the jumping action button triggers the virtual object to shoot while jumping. Since the high-order attack mode combining actions and attacks is more intuitively opened to the user through the connection button, it is more convenient for the user to perform fast operations and complete the compound operation of various attacks and actions; and is beneficial to improve the operation experience of all users. In addition, the connection button can be turned on or off by self-personalized decision through self-defined settings, and different connection buttons can be used in combination to improve the flexibility of operation while reducing the difficulty of operation.

The following continues to illustrate an exemplary structure of an object control apparatus 455 for a virtual scene provided by the embodiments of this application implemented as a software module. In some embodiments, as shown in FIG. 3, a software module stored in the object control apparatus 455 for the virtual scene of a memory 450 may include: The embodiments of this application provide an object control apparatus for a virtual scene, including: a display module 4551, configured to display a virtual scene, the virtual scene including a virtual object holding an attack prop; the display module 4551, further configured to display an attack button and at least one action button, and display at least one connection button, each connection button being configured to connect one attack button and one action button; and a control module 4552, configured to control the virtual object to execute an action associated with a target action button and control the virtual object to synchronously perform an attack operation using the attack prop in response to a trigger operation for a target connection button, the target action button being an action button connected to the target connection button in the at least one action button, and the target connection button being any connection button selected in the at least one connection button.

In some embodiments, the display module 4551 is further configured to: display an attack button associated with an attack prop currently held by the virtual object, the virtual object performing the attack operation using the attack prop when the attack button is triggered; and display at least one action button around the attack button, each action button being associated with an action.

In some embodiments, types of the at least one action button include at least one of the following: an action button associated with a high-frequency action, the high-frequency action being a candidate action with an operation frequency higher than an operation frequency threshold among a plurality of candidate actions; and an action button associated with a target action, the target action being adapted to a state of the virtual object in the virtual scene.

In some embodiments, the display module 4551 is further configured to display, for each action button in the at least one action button, the connection button configured to connect the action button and the attack button. The connection button has at least one of the following display properties: the connection button including a disabled icon in response to in a disabled state, and the connection button including an available icon in response to in an available state.

In some embodiments, the display module 4551 is further configured to: display, for the target action button in the at least one action button, the connection button configured to connect the target action button and the attack button, the action associated with the target action button being adapted to a state of the virtual object in the virtual scene; or display, for the target action button in the at least one action button, the connection button configured to connect the target action button and the attack button based on a first display mode, and display, for other action buttons except the target action button in the at least one action button, a connection button configured to connect the other action buttons and the attack button based on a second display mode.

In some embodiments, the display module 4551 is further configured to: acquire interaction data of the virtual object and scene data of the virtual scene; invoke a neural network model to predict a compound action based on the interaction data and the scene data, the compound action including the attack operation and a target action; and take an action button associated with the target action as the target action button.

In some embodiments, the display module 4551 is further configured to: determine a similar historical virtual scene of the virtual scene, a similarity between the similar historical virtual scene and the virtual scene being greater than a similarity threshold; determine a highest-frequency action in the similar historical virtual scene, the highest-frequency action being a candidate action with a highest operation frequency among a plurality of candidate actions; and take an action button associated with the highest-frequency action as the target action button.

In some embodiments, the manner in which each connection button is used for connecting an attack button and an action button includes: the connection button partially overlapping with one attack button and one action button; and a display region of the connection button being connected to one attack button and one action button through a connection identifier.

In some embodiments, before displaying the at least one connection button, the display module 4551 is further configured to determine conditions that meet an automatic display of the at least one connection button. The conditions include at least one of the following: a group of the virtual object interacting with other groups of other virtual objects; and a distance between the virtual object and the other virtual objects of the other groups being less than a distance threshold.

In some embodiments, after displaying the attack button and the at least one action button and displaying the at least one connection button, the display module 4551 is further configured to: display a plurality of candidate actions in response to a replacement operation for any action button, the plurality of candidate actions being different from actions associated with the at least one action button; and replace actions associated with the any action button with candidate actions selected in response to a selection operation for the plurality of candidate actions.

In some embodiments, the attack prop is in a single attack mode. The control module 4552 is further configured to control the virtual object to execute an action associated with the target action button once, restore a posture of the virtual object before executing the action in response to a posture after executing the action being different from the posture before executing the action, and control the virtual object to perform an attack operation once using the attack prop starting from controlling the virtual object to execute the action associated with the target action button.

In some embodiments, the trigger operation is a persistent operation for a target connection button. Before the restoring a posture of the virtual object before executing the action, the control module 4552 is further configured to: maintain the posture after executing the action until the trigger operation is released; synchronously update, when the trigger operation generates a movement track, a view angle of the virtual scene according to a direction and an angle of the movement track; and stop updating the view angle of the virtual scene in response to the trigger operation being released.

In some embodiments, the attack prop is in a continuous attack mode. The control module 4552 is further configured to: control the virtual object to execute the action associated with the target action button once when a posture after executing the action is different from a posture before executing the action, and maintain the posture after executing the action; control the virtual object to execute the action associated with the target action button once when the gesture after executing the action is the same as the gesture before executing the action; control the virtual object to continuously perform an attack operation using the attack prop starting from controlling the virtual object to execute the action associated with the target action button; restore, when the gesture after executing the action is different from the gesture before executing the action, the gesture of the virtual object before executing the action in response to the trigger operation being released, and stop controlling the virtual object to continuously perform the attack operation using the attack prop; and stop, when the posture after executing the action is the same as the posture before executing the action, controlling the virtual object to continuously perform the attack operation using the attack prop in response to the trigger operation being released.

In some embodiments, the control module 4552 is further configured to: synchronously update, in response to the trigger operation generating a movement track, a view angle of the virtual scene according to a direction and an angle of the movement track; and stop updating the view angle of the virtual scene in response to the trigger operation being released.

In some embodiments, a working mode of the target action button includes a manual mode and a locking mode, the manual mode being used for stopping triggering the target connection button after the trigger operation is released, and the locking mode being used for continuing to automatically trigger the target action button after the trigger operation is released. The control module 4552 is further configured to: control, when the trigger operation controls the target action button to enter the manual mode, the virtual object to execute the action associated with the target action button during the trigger operation is not released, and control the virtual object to synchronously perform the attack operation using the attack prop; and control, when the trigger operation controls the target action button to enter the locking mode, the virtual object to execute the action associated with the target action button during the trigger operation is not released and after the trigger operation is released, and control the virtual object to synchronously perform the attack operation using the attack prop.

In some embodiments, when the virtual scene is in the button setting state, the display module 4551 is further configured to: display, in response to a selection operation for the at least one connection button, each selected connection button according to a target display mode, the target display mode being significantly different from a display mode of an unselected connection button, and perform the following processing for each selected connection button: hiding, when the connection button is in a disabled state, a disabled icon of the connection button in response to an on operation for the connection button, and marking the connection button as an on state; and displaying, when the connection button is in the on state, the disabled icon for the connection button in response to a disabled operation for the connection button, and marking the connection button as the disabled state.

The embodiments of this application provide a computer program product including computer programs or computer-executable instructions, the computer-executable instructions being stored in a non-transitory computer-readable storage medium. A processor of an electronic device reads the computer-executable instructions from the computer-readable storage medium, and the processor executes the computer-executable instructions to cause the electronic device to execute the object control method for a virtual scene described above in the embodiments of this application.

The embodiments of this application provide a non-transitory computer-readable storage medium storing therein executable instructions. The executable instructions, when executed by a processor, implement the object control method for a virtual scene provided by the embodiments of this application, for example, the object control method for a virtual scene illustrated in FIGS. 4A to 4C.

In some embodiments, the computer-readable storage medium may be a memory such as FRAM, ROM, PROM, EPROM, EEPROM, flash memory, magnetic surface storage, optical disk, or CD-ROM; or various devices including one or any combination of the above memories.

In some embodiments, the executable instructions may be written in any form of program, software, software module, script, or code, in any form of programming language, including compiled or interpreted languages, or declarative or procedural languages. They may be deployed in any form, including as stand-alone programs or as modules, assemblies, subroutines, or other units suitable for use in a computing environment.

As an example, the executable instructions may, but need not, correspond to files in a file system, may be stored in a portion of a file that holds other programs or data, for example, in one or more scripts in a HyperText Markup Language (HTML) document, in a single file dedicated to the program in question, or in multiple coordinated files (for example, files storing one or more modules, subroutines, or portions of code).

As an example, the executable instructions may be deployed to be executed on one electronic device, or on multiple electronic devices located at one site, or on multiple electronic devices distributed across multiple sites and interconnected by a communication network.

In summary, according to the embodiments of this application, an attack button and an action button are displayed, and a connection button configured to connect the attack button and the action button is displayed; the virtual object is controlled to execute an action associated with a target action button and synchronously perform an attack operation using the attack prop in response to a trigger operation for a target connection button; and an action operation and an attack operation can be executed simultaneously by arranging the connection button, which is equivalent to using a single button to realize multiple functions simultaneously, thus improving the operation efficiency of the user.

In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. The above is only embodiments of this application and is not intended to limit the scope of protection of this application. Any modification, equivalent replacement, improvement, and the like made within the spirit and scope of this application shall be included in the scope of protection of this application.

What is claimed is:

1. A method for controlling a virtual object in a virtual scene executed by an electronic device, the method comprising:

displaying a virtual scene, the virtual scene comprising a virtual object;

displaying a first action button and a plurality of second action buttons, wherein the first action button is responsible for launching an attack using an attack prop and each of the second action buttons is responsible for causing the virtual object to change its posture in the virtual scene in a predefined manner;

displaying a respective connection button between the first action button and each of the plurality of second action buttons; and in response to a continuous trigger operation for one of the connection buttons:

controlling the virtual object to execute the attack associated with the first action button repetitively and (i) change its posture in the virtual scene and restore its posture once in the predefined manner when the attack prop is in a single attack mode and (ii) change its posture in the virtual scene once in the predefined manner and maintain its current posture when the attack prop is in a continuous attack mode.

2. The method according to claim 1, wherein the first action and the second action are executed simultaneously.

3. The method according to claim 1, wherein displaying the connection button comprises:

displaying the connection button between the first action button and the second action button.

4. The method according to claim 1, wherein displaying the connection button comprises:

displaying a first connection indicator between the connection button and the first action button and a second connection indicator between the connection button and the second action button.

5. The method according to claim 1, further comprising:

adjusting a viewing angle of the virtual object based on a movement track of the trigger operation for the connection button.

6. The method according to claim 1, further comprising:

displaying the first action button, the second action button, and the connection button in a setting interface for the connection button; and receiving an enabling operation for the connection button.

7. An electronic device, comprising:

a memory, configured to store computer-executable instructions; and a processor, configured to, when executing the computer-executable instructions stored in the memory, cause the electronic device to perform a method for controlling a virtual object in a virtual scene including:

displaying a virtual scene, the virtual scene comprising a virtual object;

displaying a first action button and a plurality of second action buttons, wherein the first action button is responsible for launching an attack using an attack prop and each of the second action buttons is responsible for causing the virtual object to change its posture in the virtual scene in a predefined manner;

displaying a respective connection button between the first action button and each of the plurality of second action buttons; and in response to a continuous trigger operation for one of the connection buttons:

controlling the virtual object to execute the attack associated with the first action button repetitively and (i) change its posture in the virtual scene and restore its posture once in the predefined manner when the attack prop is in a single attack mode and (ii) change its posture in the virtual scene once in the predefined manner and maintain its current posture when the attack prop is in a continuous attack mode.

8. The electronic device according to claim 7, wherein the first action and the second action are executed simultaneously.

9. The electronic device according to claim 7, wherein displaying the connection button comprises:

displaying the connection button between the first action button and the second action button.

10. The electronic device according to claim 7, wherein displaying the connection button comprises:

displaying a first connection indicator between the connection button and the first action button and a second connection indicator between the connection button and the second action button.

11. The electronic device according to claim 7, wherein the method further comprises:

adjusting a viewing angle of the virtual object based on a movement track of the trigger operation for the connection button.

12. The electronic device according to claim 7, wherein the method further comprises:

displaying the first action button, the second action button, and the connection button in a setting interface for the connection button; and receiving an enabling operation for the connection button.

13. A non-transitory computer-readable storage medium storing computer-executable instructions, the computer-executable instructions, when executed by a processor of an electronic device, causing the electronic device to perform a method for controlling a virtual object in a virtual scene including:

displaying a virtual scene, the virtual scene comprising a virtual object;

displaying a first action button and a plurality of second action buttons, wherein the first action button is responsible for launching an attack using an attack prop and each of the second action buttons is responsible for causing the virtual object to change its posture in the virtual scene in a predefined manner;

displaying a respective connection button between the first action button and each of the plurality of second action buttons; and in response to a continuous trigger operation for one of the connection buttons:

controlling the virtual object to execute the attack associated with the first action button repetitively and (i) change its posture in the virtual scene and restore its posture once in the predefined manner when the attack prop is in a single attack mode and (ii) change its posture in the virtual scene once in the predefined manner and maintain its current posture when the attack prop is in a continuous attack mode.

14. The non-transitory computer-readable storage medium according to claim 13, wherein the first action and the second action are executed simultaneously.

15. The non-transitory computer-readable storage medium according to claim 13, wherein displaying the connection button comprises:

displaying the connection button between the first action button and the second action button.

16. The non-transitory computer-readable storage medium according to claim 13, wherein displaying the connection button comprises:

displaying a first connection indicator between the connection button and the first action button and a second connection indicator between the connection button and the second action button.

17. The non-transitory computer-readable storage medium according to claim 13, wherein the method further comprises:

adjusting a viewing angle of the virtual object based on a movement track of the trigger operation for the connection button.

18. The non-transitory computer-readable storage medium according to claim 13, wherein the method further comprises:

displaying the first action button, the second action button, and the connection button in a setting interface for the connection button; and receiving an enabling operation for the connection button.

* * * * *